United States Patent
Nebat et al.

(10) Patent No.: US 11,082,948 B2
(45) Date of Patent: Aug. 3, 2021

(54) METHOD AND APPARATUS FOR PROCESSING A MULTICAST BROADCAST DATA STREAM

(71) Applicant: Wi-LAN Inc., Ottawa (CA)

(72) Inventors: Yoav Nebat, Santee, CA (US); Sina Zahedi, San Mateo, CA (US); Dennis Connors, San Diego, CA (US)

(73) Assignee: Wi-LAN, INC., Ottawa (CA)

( * ) Notice: Subject to any disclaimer, the term of this patent is extended or adjusted under 35 U.S.C. 154(b) by 38 days.

(21) Appl. No.: 15/666,387

(22) Filed: Aug. 1, 2017

(65) Prior Publication Data
US 2017/0332351 A1    Nov. 16, 2017

Related U.S. Application Data

(63) Continuation of application No. 14/684,130, filed on Apr. 10, 2015, which is a continuation of application No. 13/126,308, filed as application No. PCT/US2009/062802 on Oct. 30, 2009, now abandoned.
(Continued)

(51) Int. Cl.
| | |
|---|---|
| *H04W 72/00* | (2009.01) |
| *H04L 12/18* | (2006.01) |
| *H04W 88/18* | (2009.01) |

(52) U.S. Cl.
CPC ......... *H04W 72/005* (2013.01); *H04L 12/189* (2013.01); *H04L 12/1881* (2013.01); *H04W 88/18* (2013.01)

(58) Field of Classification Search
CPC ............... H04W 72/005; H04W 88/18; H04L 12/1881; H04L 12/189
See application file for complete search history.

(56) References Cited

U.S. PATENT DOCUMENTS

| | | |
|---|---|---|
| 6,215,766 B1 | 4/2001 | Ammar et al. |
| 2004/0095907 A1 | 5/2004 | Agee et al. |

(Continued)

OTHER PUBLICATIONS

IEEE Standard for Local and metropolitan area networks; Part 16: Air Interface for Broadband Wireless Access Systems, IEEE Std. 802.16-2004 (Oct. 1, 2004).[1]

(Continued)

*Primary Examiner* — Christopher M Crutchfield
*Assistant Examiner* — Tito Q Pham
(74) *Attorney, Agent, or Firm* — Volpe Koenig

(57) ABSTRACT

A multicast broadcast service controller is disclosed. The MBSC processes multicast broadcast data streams for transmission to access service network gateways or base stations. The MBSC includes a MBSC core processor for establishing time synchronization information used by the access service network gateways or base stations to synchronously transmit data streams. The MBSC core processor selects streams for transmission in a time diversity interval (TDI) and builds multicast broadcast (MBS) region content based on the selected streams and configuration information. The MBS region content includes timing synchronization information, resource information and MBS region content location information. A MBS region distribution module (MRD) transmits the MBS region content to the access service network gateways or base stations.

20 Claims, 23 Drawing Sheets

Related U.S. Application Data

(60) Provisional application No. 61/110,455, filed on Oct. 31, 2008.

(56) References Cited

U.S. PATENT DOCUMENTS

| | | |
|---|---|---|
| 2005/0122928 A1 | 6/2005 | Vijayan et al. |
| 2006/0083263 A1 | 4/2006 | Jagadeesan et al. |
| 2007/0147542 A1 | 6/2007 | Schmidt et al. |
| 2007/0230351 A1* | 10/2007 | Dang .............. H04B 7/022 370/236 |
| 2008/0037510 A1 | 2/2008 | Yamada et al. |
| 2008/0170528 A1* | 7/2008 | Bosch ............ H04N 21/2221 370/312 |
| 2008/0175238 A1 | 7/2008 | Venkatachalam |
| 2008/0205394 A1 | 8/2008 | Deshpande et al. |
| 2008/0227428 A1 | 9/2008 | Rezaiifar et al. |
| 2008/0259835 A1* | 10/2008 | Venkatachalam ..... H04L 12/189 370/311 |
| 2008/0259849 A1 | 10/2008 | Connors et al. |
| 2008/0259905 A1* | 10/2008 | Connors ............ H04W 36/02 370/350 |
| 2009/0147877 A1 | 6/2009 | Connors et al. |
| 2010/0002728 A1 | 1/2010 | Odenwalder et al. |
| 2010/0067459 A1 | 3/2010 | Goransson et al. |
| 2010/0165902 A1 | 7/2010 | Kvernvik et al. |

OTHER PUBLICATIONS

IEEE Standard for Local and metropolitan area networks; Part 16: Air Interface for Broadband Wireless Access Systems, IEEE Std. 802.16-2009 (May 29, 2009).².

International Standard, Information Technology—Generic coding of moving pictures and associated audio information: Systems, ISO/IEC 13818-1 (Dec. 1, 2000).

International Telecommunication Union, Series X: Data Networks and Open System Communication; Public data networks—Interfaces; Interfae between Data Terminal Equipment (DTE) and Data Circuit-terminating Equipment (DCE) for terminals operating in the packet mode and connected to public data networks by dedicated circuit, ITU-T X.25 (Oct. 1996).

Mills, NTP Architecture, Protocol, and Algorithms, pp. 1-26 (Jul. 22, 2007) available at http://www.eecis.udel.edu/~mills/database/brief/arch/arch.pdf.

Wikipedia, Network Time Protocol, pp. 1-4 (Oct. 5, 2008).

* cited by examiner

METHOD AND APPARATUS FOR PROCESSING A MULTICAST BROADCAST DATA STREAM

CROSS REFERENCE TO RELATED APPLICATIONS

This application is a continuation of U.S. patent application Ser. No. 14/684,130 filed on Apr. 10, 2015 which is a continuation of U.S. patent application Ser. No. 13/126,308 filed on Oct. 7, 2011, which is a national stage application of PCT Application No. PCT/US2009/062802, filed Oct. 30, 2009, which claims the benefit of U.S. Provisional Application No. 61/110,455, filed Oct. 31, 2008. All of the above referenced applications are hereby incorporated by reference herein.

TECHNICAL FIELD

This disclosure is related to wireless communications.

BACKGROUND

Multicasting and broadcasting refers generally to sending information to a plurality of receivers. In multicasting and/or broadcasting data, a system may use macro-diversity, which refers to a type of transmission in which a plurality of base stations synchronously transmit the data over the same frequency, using the same waveform, and using about the same framing parameters. Multiple versions of the same signal received from the multiple base stations may be combined to produce a signal with improved signal strength at the receiver. The gain achieved by combining these multiple versions of the same signal is often referred to as "macro-diversity gain." A network employing macro-diversity is sometimes referred to as a single frequency network (SFN).

SUMMARY

A multicast broadcast service controller (MBSC) is disclosed. The MBSC processes multicast broadcast data streams for transmission to access service network gateways or base stations. The MBSC includes a MBSC core processor for establishing time synchronization information used by the access service network gateways or base stations to synchronously transmit data streams. The MBSC core processor may select streams for transmission in a time diversity interval (TDI) and builds multicast broadcast (MBS) region content based on the selected streams and configuration information. The MBS region content may include timing synchronization information, resource information and MBS region content location information. A MBS region distribution module (MRD) transmits the MBS region content to the access service network gateways or base stations.

BRIEF DESCRIPTION OF THE DRAWINGS

A more detailed understanding may be had from the following description, given by way of example in conjunction with the accompanying drawings wherein.

DETAILED DESCRIPTION

Figure 1:
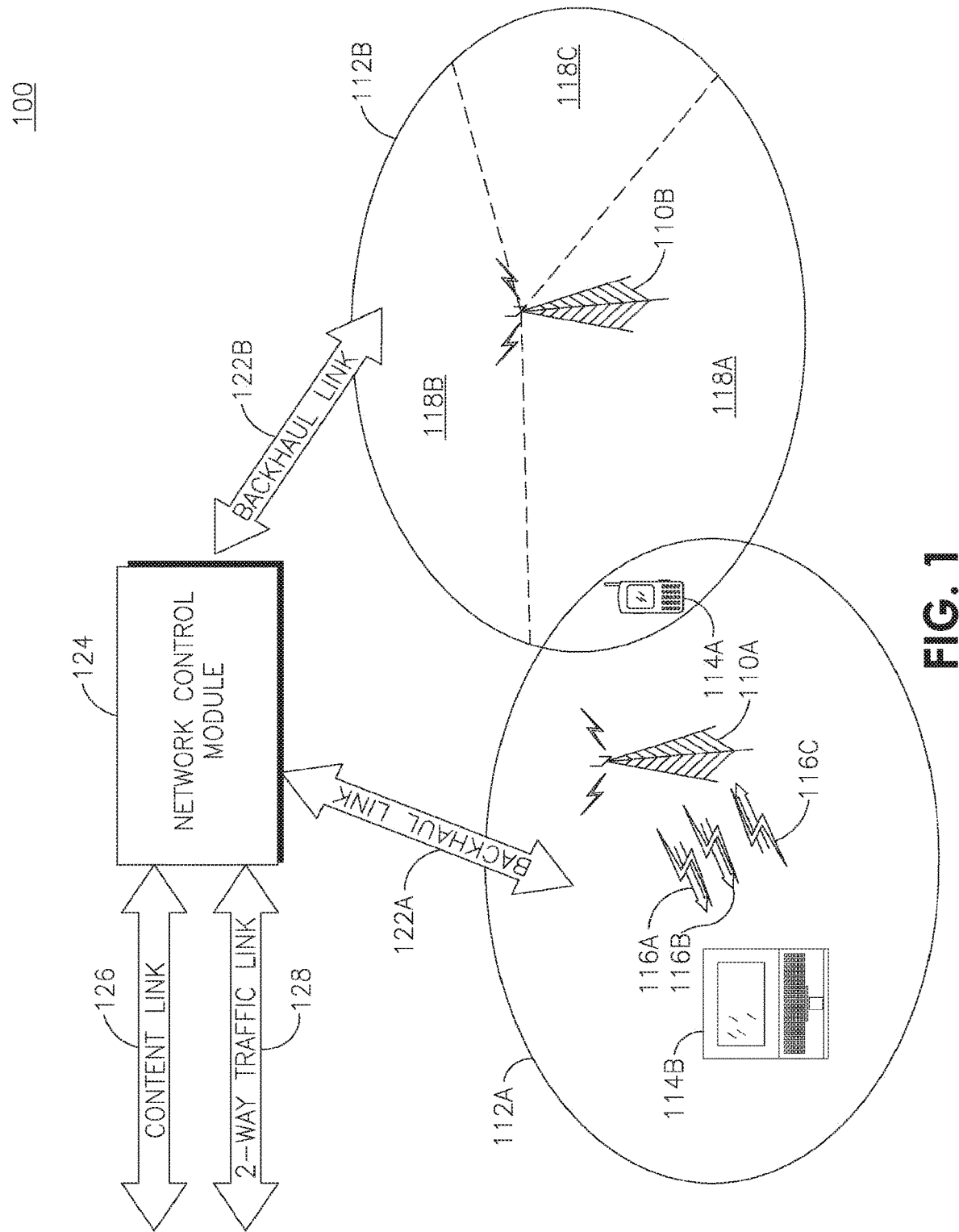
FIG. 1 depicts an example block diagram of a network including client stations and base stations.

FIG. 1 is a simplified functional block diagram of an embodiment of a wireless communication system 100. The wireless communication system 100 includes a plurality of base stations 110A and 110B, each supporting a corresponding service or coverage area 112A and 112B. The base stations are capable of communicating with client stations within their respective coverage areas. For example, the first base station 110A is capable of wirelessly communicating with a first client station 114A and a second client station 114B within the coverage area 112A. The first client station 114A is also within the coverage area 112B and is capable of communicating with the second base station 110B. In this description, the communication path from the base station to the client station is referred to as downlinks 116A and 116B and the communication path from the client station to the base station is referred to as an uplink 116C.

Although for simplicity only two base stations are shown in FIG. 1, a typical wireless communication system 100 may include a much larger number of base stations. The base stations 110A and 110B may be configured as cellular base station transceiver subsystems, gateways, access points, radio frequency (RF) repeaters, frame repeaters, nodes, Node-B, site controllers, wireless network entry points or any other type of interfacing device capable of operating in a wireless environment.

The base stations 110A and 110B may be configured to support an omni-directional coverage area or a sectored coverage area. For example, the second base station 110B is depicted as supporting the sectored coverage area 112B. The coverage area 112B is depicted as having three sectors, 118A, 118B, and 118C. In typical embodiments, the second base station 110B treats each sector 118 as effectively a distinct coverage area.

Although only two client stations 114A and 114B are shown in the wireless communication system 100, typical systems are configured to support a large number of client stations. The client stations 114A and 114B may be mobile, nomadic, or stationary units. The client stations 114A and 114B are often referred to as, for example, mobile stations, mobile units, subscriber stations, wireless terminals, or the like. A client station may be, for example, a wireless transmit/receive unit (WTRU), a user equipment (UE), a fixed or mobile subscriber unit, a wireless handheld device, a vehicle mounted device, a portable device, client premise equipment, a fixed location device, a wireless plug-in accessory or the like. In some cases, a client station may take the form of a handheld computer, notebook computer, wireless telephone, personal digital assistant, wireless email device, personal media player, meter reading equipment, a pager, a cellular telephone, a computer, a wireless device, any other type of user device capable of operating in a wireless environment or the like and may include a display mechanism, microphone, speaker and memory.

In a typical system, the base stations 110A and 110B also communicate with each other and a network control module 124 over backhaul links 122A and 122B. The backhaul links 122A and 122B may include wired and/or wireless communication links. The network control module 124 may provide network administration and coordination as well as other overhead, coupling, and supervisory functions for the wireless communication system 100.

In some embodiments, the wireless communication system 100 may be configured to support both bidirectional communication and unidirectional communication. In a bidirectional network, the client station is capable of both receiving information from and providing information to the wireless communications network. Applications operating over the bidirectional communications channel include traditional voice and data applications. In a unidirectional network, the client station is capable of receiving information from the wireless communications network but may have limited or no ability to provide information to the network. Applications operating over the unidirectional communications channel include broadcast and multicast applications. In one embodiment, the wireless system 100 supports both bidirectional and unidirectional communications. In such an embodiment, the network control module 124 is also coupled to external entities via, for example, content link 126 (e.g., a source of digital video and/or multimedia) and two-way traffic link 128.

The wireless communication system 100 may be configured to use Orthogonal Frequency Division Multiple Access (OFDMA) communication techniques. For example, the wireless communication system 100 may be configured to substantially comply with a standard system specification, such as IEEE 802.16 and its progeny or some other wireless standard such as, for example, WiBro, WiFi, Long Term Evolution (LTE) and their progeny, or it may be a proprietary system. The subject matter described herein is not limited to application to OFDMA systems or to the noted standards and specifications. The description in the context of an OFDMA system is offered for the purposes of providing a particular example only.

As used herein, IEEE 802.16 refers to one or more Institute of Electrical and Electronic Engineers (IEEE) Standard for Local and metropolitan area networks, Part 16: Air Interface for Fixed Broadband Wireless Access Systems, 1 Oct. 2004, IEEE Standard for Local and metropolitan area networks, Part 16: Air Interface for Fixed and Mobile Broadband Wireless Access Systems, 26 Feb. 2006, and any subsequent additions or revisions to the IEEE 802.16 series of standards.

In some embodiments, downlinks 116A-B and uplink 116C each represent a radio frequency (RF) signal. The RF signal may include data, such as voice, video, images, Internet Protocol (IP) packets, control information, and any other type of information. When IEEE-802.16 is used, the RF signal may use OFDMA. OFDMA is a multi-user version of orthogonal frequency division multiplexing (OFDM). In OFDMA, multiple access is achieved by assigning to individual users groups of subcarriers (also referred to as subchannels or tones). The subcarriers are modulated using binary phase shift keying (BPSK), quadrature phase shift keying (QPSK), quadrature amplitude modulation (QAM), and carry symbols (also referred to as OFDMA symbols) including data coded using a forward error-correction code.

Figure 2:
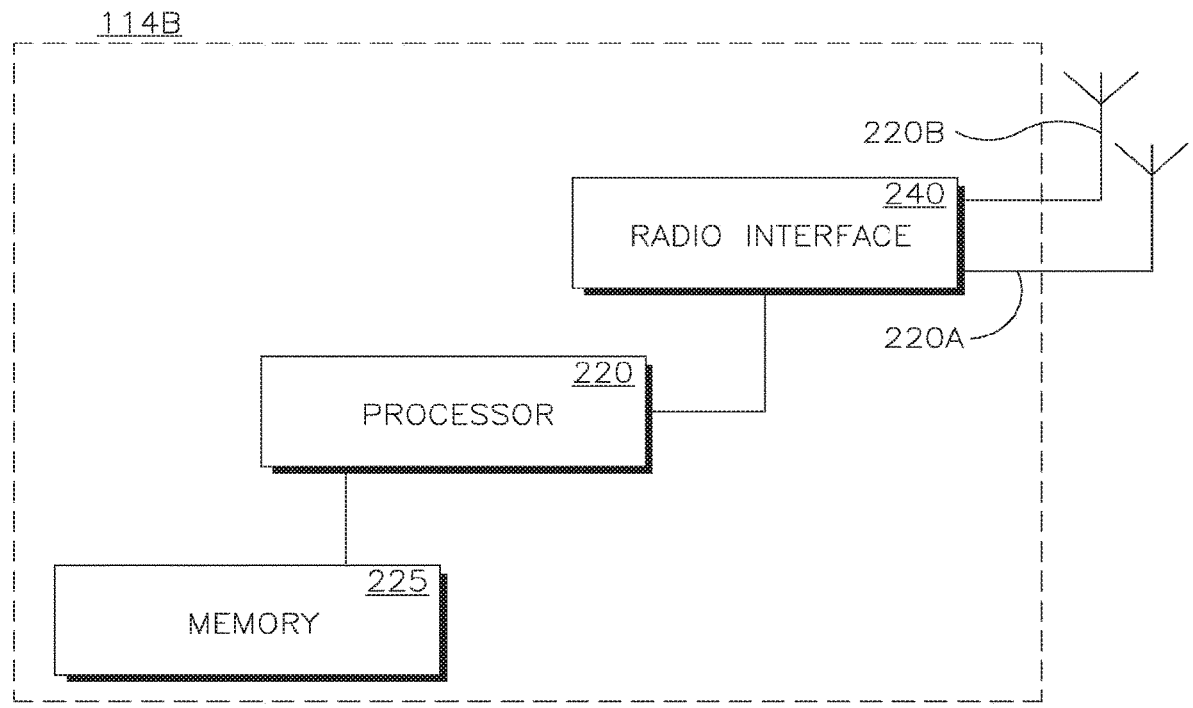
FIG. 2 depicts an example block diagram of a client station.

FIG. 2 depicts an example client station, such as client station 114B. The client station 114B includes one or more antennas 220A-B for receiving the downlinks 116A-B. The client station 114B also includes a radio interface 240, which may include other components, such as filters, converters (for example, digital-to-analog converters and the like), symbol demappers, an Inverse Fast Fourier Transform (IFFT) module, and the like, to process symbols, such as OFDMA symbols, carried by downlinks 116A-B. In some implementations, the client station 114B is also compatible with IEEE 802.16 and OFDMA. The client station 114B further includes a processor 220 for controlling client station 114B and for accessing and executing program code stored in memory 225.

Figure 3:
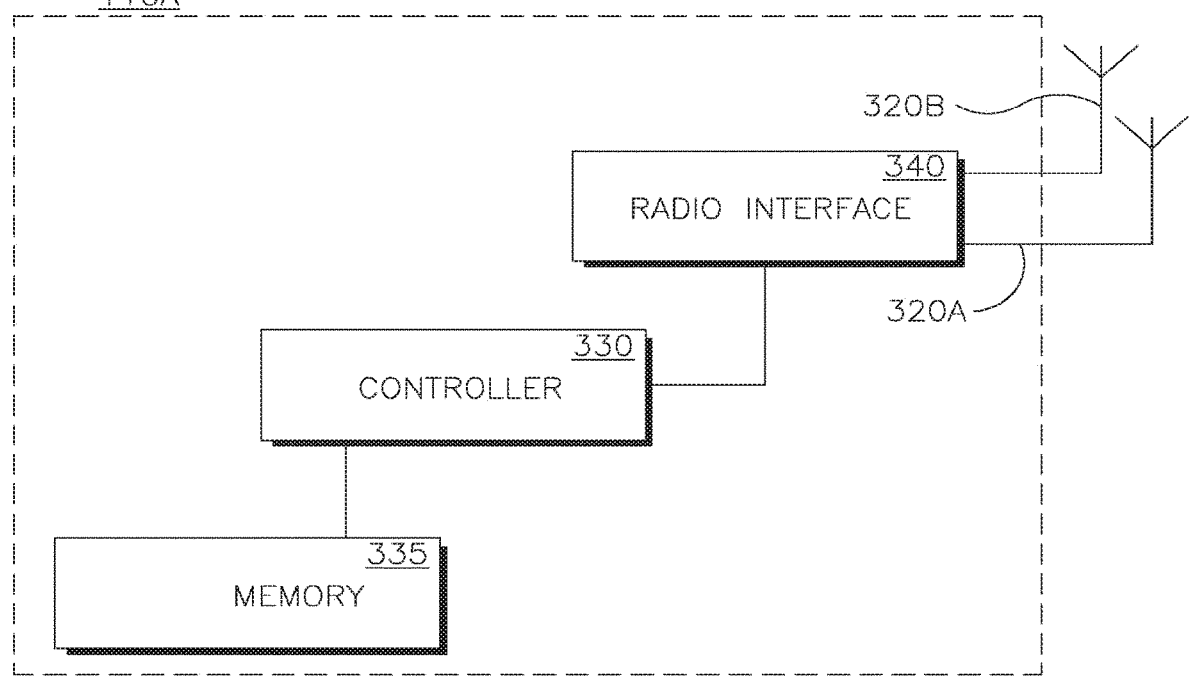
FIG. 3 depicts an example block diagram of a base station.

FIG. 3 depicts a base station, such as base station 110A. The base station 110A includes one or more antennas 320A-B configured to transmit via downlinks 116A-B and configured to receive uplinks, such as uplink 116C via at least one of antennas 320A-B. While only two antennas 320A-B are depicted, base station 11A may include any number of antennas. The base station 110A further includes a radio interface 340 coupled to the antennas 320A-B, a processor 330 for controlling base station 110A and for accessing and executing program code stored in memory 335. The radio interface 340 may further include other components, such as filters, converters (for example, digital-to-analog converters and the like), mappers, a Fast Fourier Transform (FFT) module, and the like, to generate symbols for a transmission via one or more downlinks 116A-B and to receive symbols via uplink 116C. In some implementations, the base station 110A is also compatible with IEEE 802.16 and the RF signals of downlinks 116A-B and uplinks 116C are configured as an OFDMA signal.

Disclosed herein is an example implementation of a multicast broadcast service (MBS) controller (MBSC) for delivering mobile multicast and broadcast services such as mobile TV, interactive services and digital audio. Example architecture for delivering the service is presented, followed by example implementations of the MBSC including block diagrams, state diagrams and methods for processing the data to and from the MBSC.

It is noted for illustrative purposes that the configuration parameters in the MBSC are aligned with the configuration management parameters at the element management system (EMS) controlling the high-level configuration parameters of the network. Furthermore, the incoming bit rate from a content delivery server (CDS) for each partition (class of service) may be bounded from above by a predetermined constant. Pre-programmed changes to these constants at known time instants are supported and these times and new constant sets may be programmable in the MBSC. The size of the MBS region may be adjusted by the MBSC and that no feedback from the base stations may be considered in determining the size of the MBS region. Furthermore, OFDMA frames in the network are synchronous with the 1 pps global positioning system (GPS) pulses, i.e., the 1 pps pulse marks the beginning of an OFDMA frame.

It is also noted for illustrative purposes that handling of dropped packets on the backhaul may depend on the specifics of the MBS region distribution protocol (MRDP) process. Different embodiments are disclosed herein and may be useful if the backhaul is not fully reliable. In general, the base station (BS) should not transmit in any area where uncertainty about the existence or content of the MBS region exists. If packets containing a particular MBS frame get corrupted on the backhaul, depending on the recovered information, several scenarios are possible. First, the entire MBS frame may be lost or any data to be transmitted in the MBS frame may be lost and the width of the MBS region in the particular frame may not be known. The BS may assume all the symbols corresponding to the MBS numbering system (MNS) in a corresponding frame are to be utilized for MBS transmission, and remain silent for the duration of those symbols. In a second scenario, the entire MBS frame may be lost or any data to be transmitted in the MBS frame may be lost, yet the width and location of the MBS frame may still be determined. In this scenario, the BS may not transmit anything in the corresponding MBS region.

Figure 4:
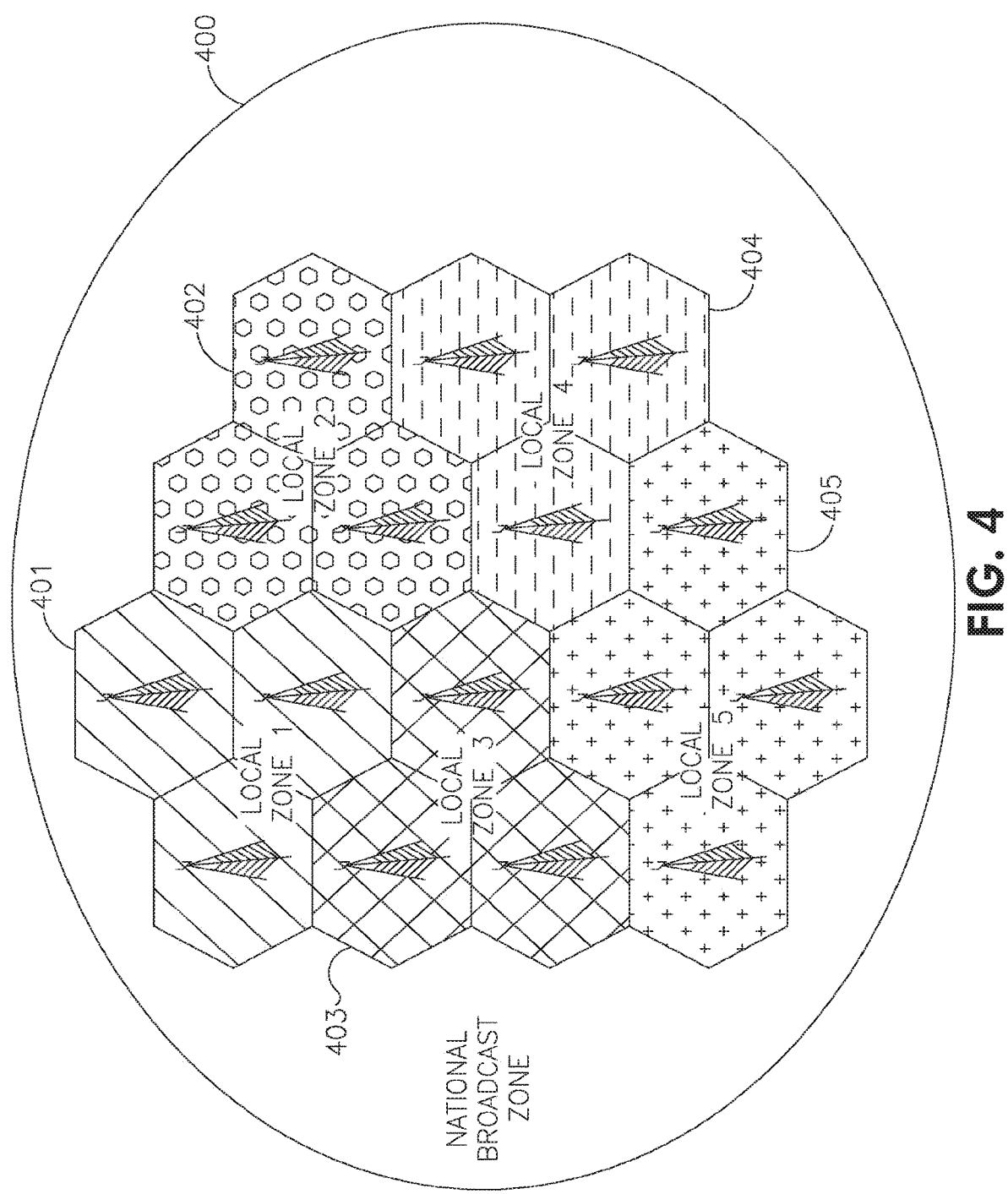
FIG. 4 shows an example concurrent coverage of national and local broadcast content.

Referring now to FIG. 4, an example concurrent coverage scheme is illustrated. A broadcast service network (BSN) is responsible for delivery of broadcast service content generated by a content service network (CSN) to client stations, such as the mobile stations (IVIS) shown in the figure. The BSN may be capable of broadcasting different types of content in different geographical areas. In particular, it may be able to distribute national broadcast content over a wide geographical area, such as national broadcast zone 400, while transmitting different local broadcast content in different geographical areas, such as local zones 401-405. National broadcast zone 400 may cover several local broadcast zones 401-405. For example, as shown in FIG. 4, national broadcast content may be available in addition to the local broadcast content in each local broadcast zone 401-405.

Figure 5:
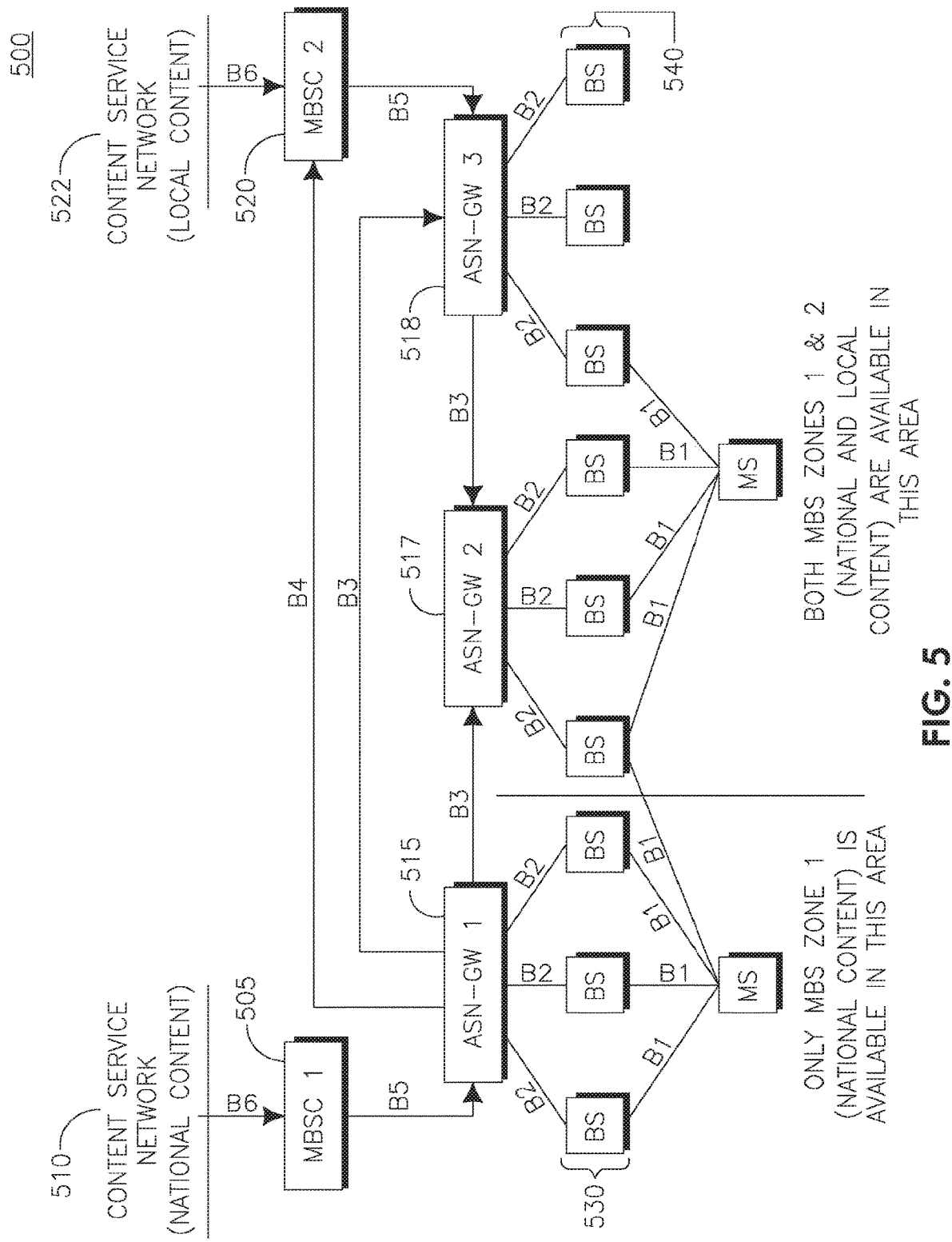
FIG. 5 shows an example interaction diagram of the broadcast service network (BSN)

Referring now to FIG. 5, an example network architecture of the BSN 500 is shown. BSN 500 includes a MBSC 1 505 that is responsible for scheduling the MBS region for the national broadcast content. Packets received from CSN 510 over a B6 link may be scheduled for transmission and may be delivered to access service network gateway (ASN-GW) 1 515 over a B5 link. ASN-GW1 515 forwards the received stream, which includes instructions for building the MBS region of individual OFDMA frames, to connected base stations that are part of the national broadcast coverage area (NBCA) over B2 links. This is shown as MBS Zone 1 and MBS Zone 2 in FIG. 5. Furthermore, ASN-GW1 515 forwards the received stream over B3 links to all ASN-GWs that are connected to base stations (for example, BS 530 and 540) within the NBCA (in this example, ASN-GW2 517 and ASN-GW3 518). Moreover, ASN-GW1 515 sends information over B4 links to all the MBSCs responsible for scheduling overlapping local broadcast coverage areas (LBCA), such as for example, MBSC 2 520, to inform them of the resources consumed by the MBSC responsible for national broadcast content (for example, MBSC 1 505). These resources include the OFDMA frames and individual symbols within those OFDMA frames dedicated to national broadcast content such that the MBSC responsible for scheduling the local broadcast (for example, MBSC 2 520) content avoids scheduling within those OFDMA frames and in particular those OFDMA symbols used by the national broadcast content.

As noted, MBSC2 520 is responsible for scheduling local broadcast content received from local CSN 522 over a B6 link. MBSC 2 520 performs constrained scheduling considering OFDMA frames that are used by MBSC 1 510. Scheduled OFDMA frames will be transmitted to ASN-GW3 518 over a B5 link. ASN-GW3 518 then forwards the frame structure over B3 links to ASN-GW2 517, which also covers part of the LBCA. ASN-GW2 517 and ASN-GW3 518 forward the structure of frames containing the local content to relevant base stations (for example, BS 540) within the LBCA.

Interfaces B2, B3 and B5 may be very similar in nature. In particular, the data plane on all or several of these three interfaces may be reused. In one embodiment, the same interface (data and control plane) may be used for all of these interfaces. Interface B4 may contain a subset of information carried on the B2, B3 and B5 links, as the content does not need to be carried over this link and the frame structure is sufficient. In another embodiment, the B4 link may also use the same interface. For illustrative purposes only, the discussion herein assumes that interfaces B2, B3, B4 and B5 are identical both in control plane and in bearer data plane. These links may use the MRDP disclosed herein.

Figure 6:
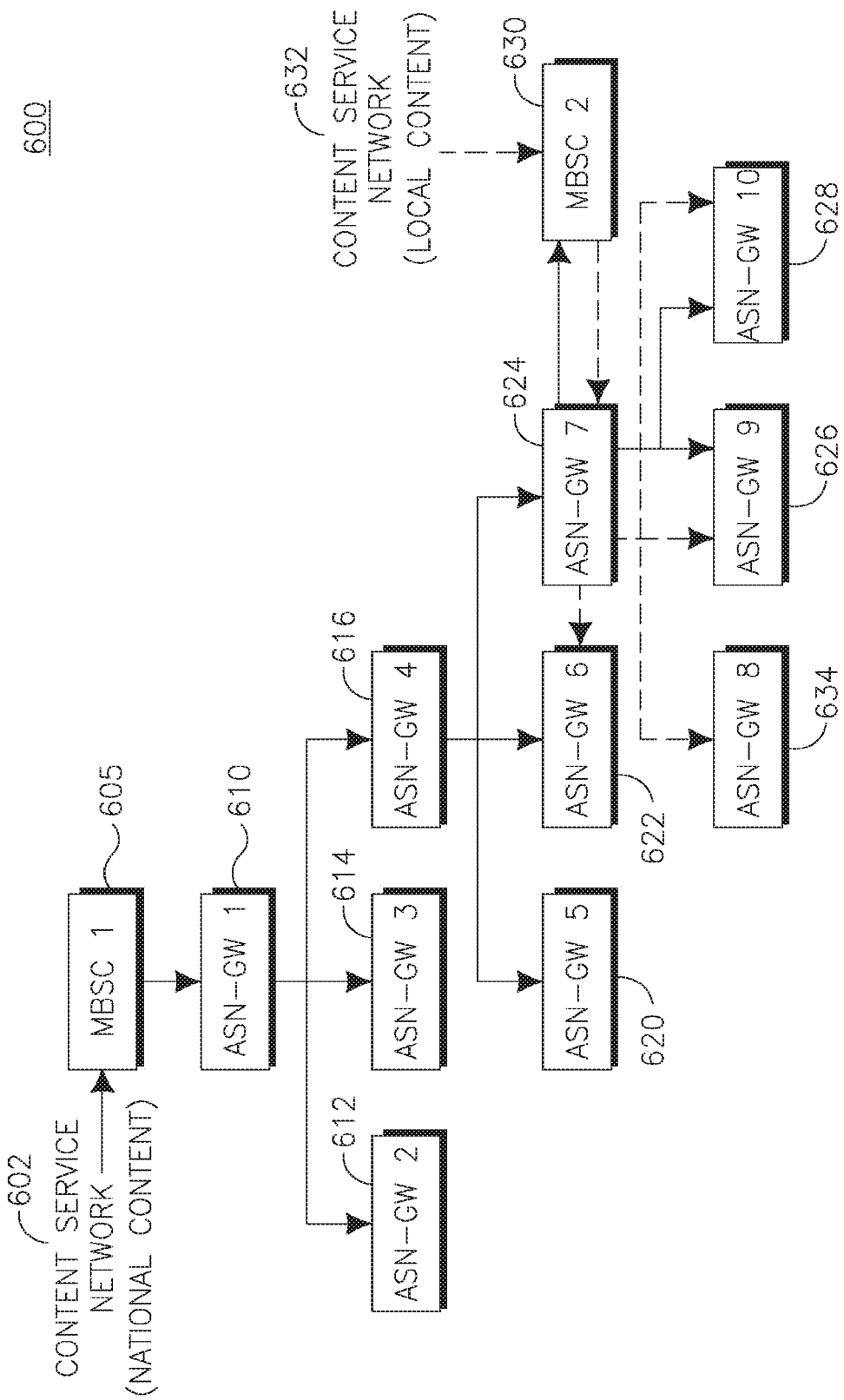
FIG. 6 shows an example hierarchical network architecture.

The example BSN 500 structure may be extended to a hierarchical structure 600 as shown in FIG. 6. In hierarchical structure 600, each ASN-GW may have a forwarding table that indicates the list of recipients of certain content. For example, MBSC 1 605 schedules and sends national content from CSN 602 to ASN-GW1 610 which further distributes the national content to ASN-GW2 612, ASN-GW3 614 and ASN-GW4 616. ASN-GW4 616 then distributes the national content to ASN-GW5 620, ASN-GW6 622 and ASN-GW7 624. ASN-GW7 624 further distributes the national content to ASN-GW9 626 and ASN-GW10 628 as well as to MBSC 2 630, which is responsible for scheduling the local content from CSN 632 for an overlapping area. MBSC 2 630 schedules and sends the local content to ASN-GW7 624 which further distributes it to ASN-GW6 622, ASN-GW8 634, ASN-GW9 626 and ASN-GW10 628. Note that only a handful of ASN-GWs need to have forwarding capability (for example, ASN-GW1 610, ASN-GW4 616, and ASN-GW7 624). Moreover, only a limited number of ASN-GWs need to be able to connect to MBS controllers (for example, ASN-GW1 610 and ASN-GW7 624).

The functional requirements of the MBSC are disclosed herein such that the core functional specifications of the MBSC are not affected by the presence or lack thereof, of an ASN-GW. These core functional specifications also allow for coexistence of different kinds of base stations in the network, those that require the presence of an ASN-GW, and those that operate independent of an ASN-GW. The interface part of the MBSC to the downstream network devices known as MRDPs may handle these different connections.

In general, the MBSC is a separate entity than the ASN-GW but may be co-located with it. Alternatively, they may not necessarily sit in the same box. The ASN-GW may or may not be present in the network. If an ASN-GW is present in the network, the task of the MBSC is to deliver the MBS frame information to the ASN-GW. The ASN-GW may distribute this information to base stations. If a connection to the ASN-GW is not available, then the MBSC may directly send the MBS region content and setup information to base stations in the network over a set of switches and routers.

Figure 7:
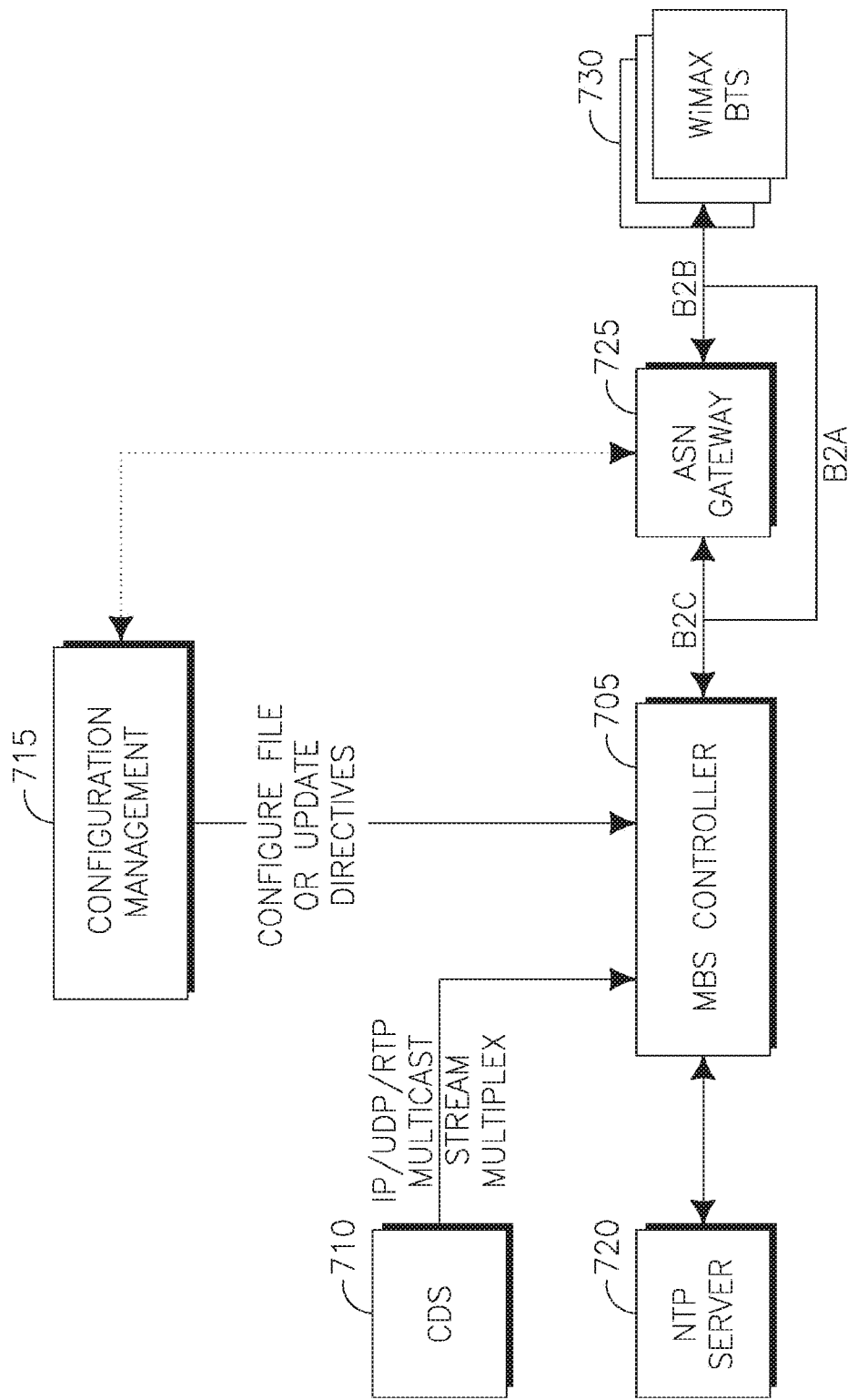
FIG. 7 shows an example interaction of a multicast broadcast service controller (MBSC) with network components.

Referring now to FIG. 7, the input to an MBSC 705 is an IP packet stream from a content delivery server (CDS) 710. The MBSC 705 is further connected to a network time protocol (NTP) server 720 and may be connected to an ASN-GW 725. The MBSC 705 may also be connected to a base station, such as WiMAX BTS 730, through ASN-GW 725 or directly via a B2a link.

The MBSC 705 builds the MBS region and sends it to base stations. It provides timing information to base stations to make sure that all base stations transmit the same waveform at the MBS region in the same frame. The MBSC also provides the location of the MBS region in each frame to all base stations. The MBSC ensures that a substantially similar analog signal is transmitted at a substantially similar time from the base stations associated with an MBS region, therefore providing macro-diversity. Methods for building the content of the MBS region and providing timing information such that different base stations may generate synchronous waveforms in the MBS region are disclosed.

Upon reset, the MBSC 705 may be programmed with a configuration file from configuration management 715. This file contains the list of all parameters required by the MBSC 705 to specify the incoming traffic from the CDS 710, the requirements and parameters of the outgoing traffic, and some management information. Specific configuration elements may also be individually changed by the configuration management 715 providing configuration flexibility. The MBSC 705, based on the configuration parameters, builds the MBS region and sends it to the BS over the B2 interface. Upon a reset and/or on a periodic basis, the MBSC 705 establishes a common time base for the MBS region transmitted by different base stations. A procedure to achieve synchronicity is disclosed herein.

Figure 8:
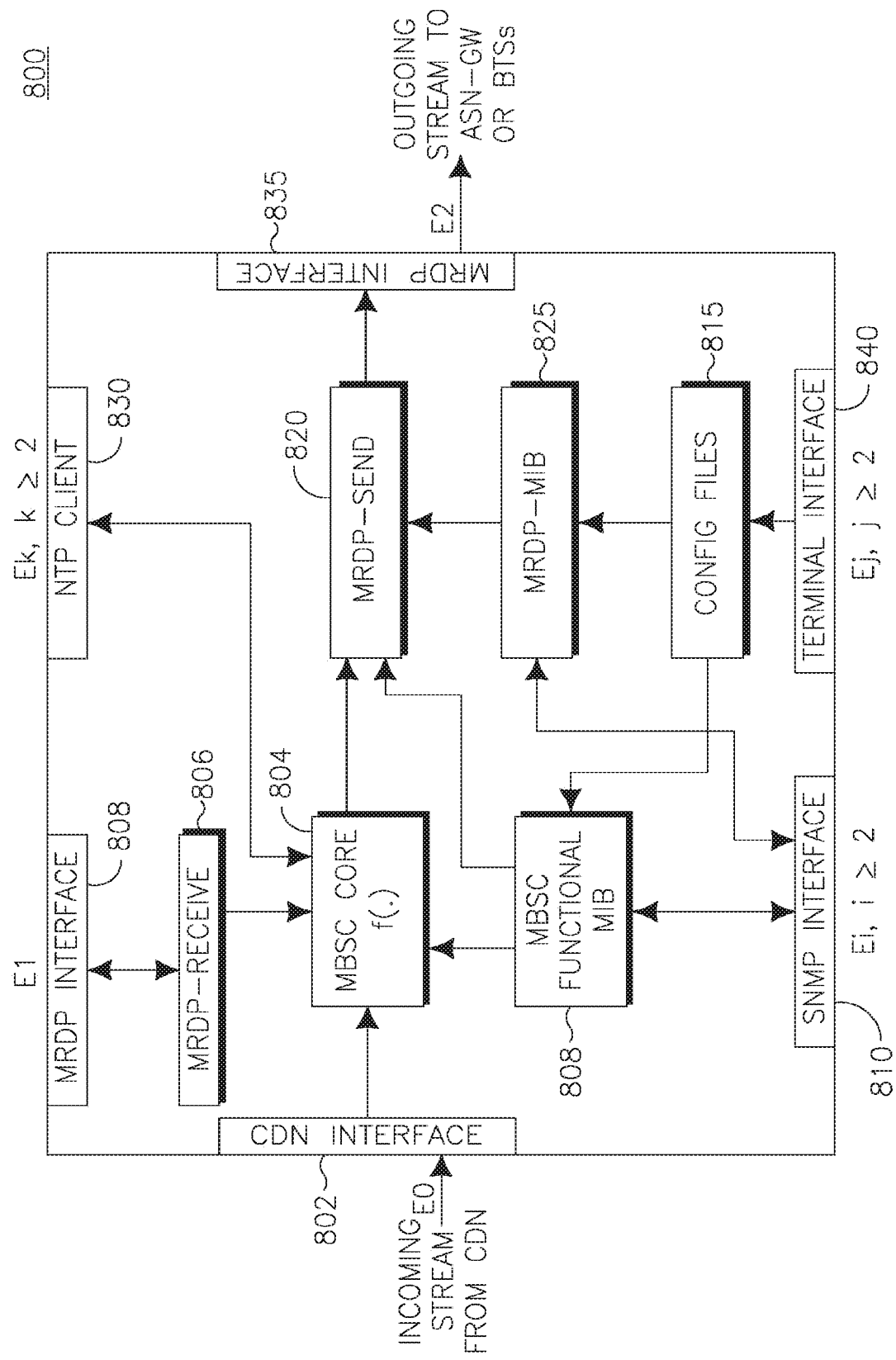
FIG. 8 shows an example MBSC block diagram.

Referring now to FIG. 8, an example block diagram of a MBSC 800 is shown. MBSC 800 receives an input stream on Ethernet Port E0 at a CDN interface 802. A MBSC Core 804 receives and buffers the stream from CDN interface 802. The MBSC Core 804 is further connected to a MRDP-Receive module 806 which in turn is connected to a MRDP Interface 808. The MBSC Core 804 is also connected to a MBSC functional management information base (MIB) 808 which in turn is connected to a simple network management protocol (SNMP) interface 810. MBSC functional MIB 808 receives information from configuration files 815 and sends information to MRDP-Send 820. SNMP interface 810 is further connected to MRDP MIB 825, which in turn receives information from configuration files 815 and sends information to MRDP-Send 820. A terminal interface 840 is connected to configuration files 815.

The MBSC Core 804 is further connected to NTP Client 830 and sends information to MRDP-Send 820, which in turn sends information to MRDP Interface 835. MRDP Interface 835 outputs a stream to ASN-GW(s) or base station(s).

The MBSC 800 maintains a configuration file in configuration files 815. A set of configuration parameters may be stored in the configuration file, and the content of this file may be used to populate the MIBs of the MBSC 800. For example, the MBSC functional MIB 808 contains configuration elements that are affecting the functional behavior of the MBSC 800 and the MRDP MIB 825 contains configuration parameters that are related to interfacing aspects of the MBSC 800 and does not necessarily control the functional behavior of the MBSC 800.

Individual configuration parameters in the configuration file may be modified by SNMP management via SNMP Interface 810. Moreover, configuration files may be stored and/or manipulated on the MBSC 800 over an API interface. A configuration file may contain a set of configuration parameters. The API interface may designate a configuration file to become effective, i.e., its elements may populate the two controlling MIBs, for example, MBSC MUB 808 and MRDB MIB 825. The API interface may also issue commands for updating individual configuration parameters. In this case, corresponding elements of the appropriate MIB may be updated.

The MBSC 800 goes through a reset cycle in response to a reset command. Before any reset, a configuration file may be designated to be used as the configuration file after the reset. If such a file is not designated, the current set of configuration parameters from the two MIBs may be used to repopulate internal databases. The MBSC 800 may be capable of designating a configuration file as the default configuration file. If a configuration file is not designated with a reset command, the default configuration file may be used after the reset to configure the MIBs. A reset command without a designated configuration file uses the default configuration file after the reset. Updating some configuration parameters may also trigger a reset. In such a case, a new configuration file may be automatically built based on the current set of configuration parameters and the updated parameter. It may be used as the configuration file after the reset.

The MBSC receives a multiplex of multimedia streams from the CDS. The multiplex may be de-multiplexed into queues of streams and optional substreams. The MBSC may be configured to support the transmission of up to 50 Quarter Video Graphics Array (QVGA) H.264/AAC encoded streams, at an average rate of 300 kbps each, amounting to 15 Mbps. As scheduling methods performed by the MBSC may be predictive in nature, with a two or more TDI relevance, and data may need to be buffered to provide sufficient playback delay, the MBSC shall be capable of storing at any given time at least 20 Mbytes of data in its queues, and have sufficient memory space for construction of outer-code encoding arrays, addition of outer-coding parity, and storing data forwarded to the MRDP-MBSC.

The MBSC may support the transmission of up to 50 QVGA H.264/AAC encoded streams, at an average rate of 300 kbps each, amounting to 15 Mbps. This is the underlying assumed worst case incoming bit rate, and number of traffic streams. In addition, the MBSC may be able to handle the processing required with up to an average of 5 substreams per-stream, or a total of 250 substreams. The MBSC may be capable of de-multiplexing the incoming multiplex into substream queues, perform per-substream outer-coding operations, schedule transmission of the entire multiplex or portions thereof, and handle forwarding of the data through MRDP-MBSC all in line rate and in real-time.

Figure 9:
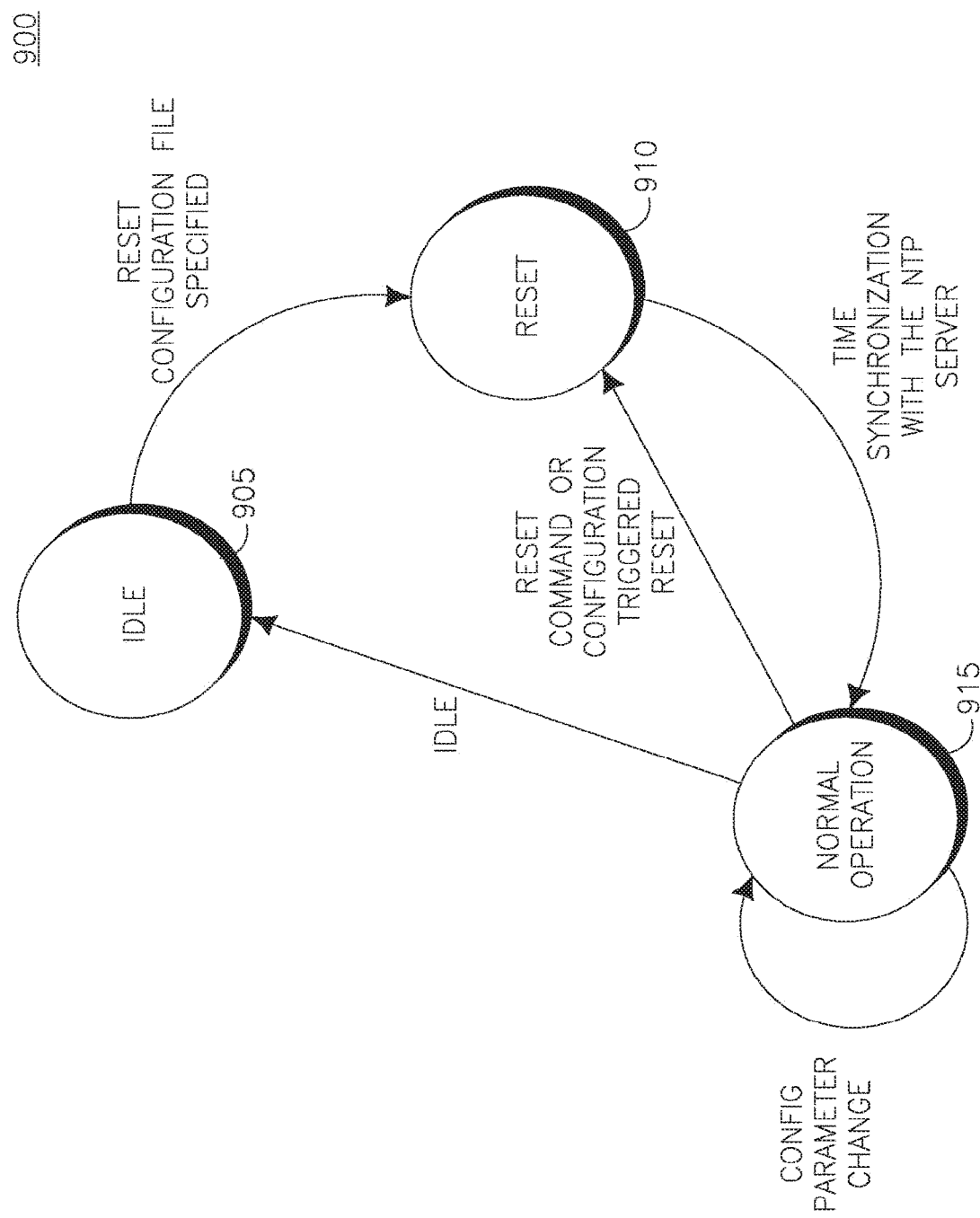
FIG. 9 shows an example MBSC state transition diagram.
Figure 10:
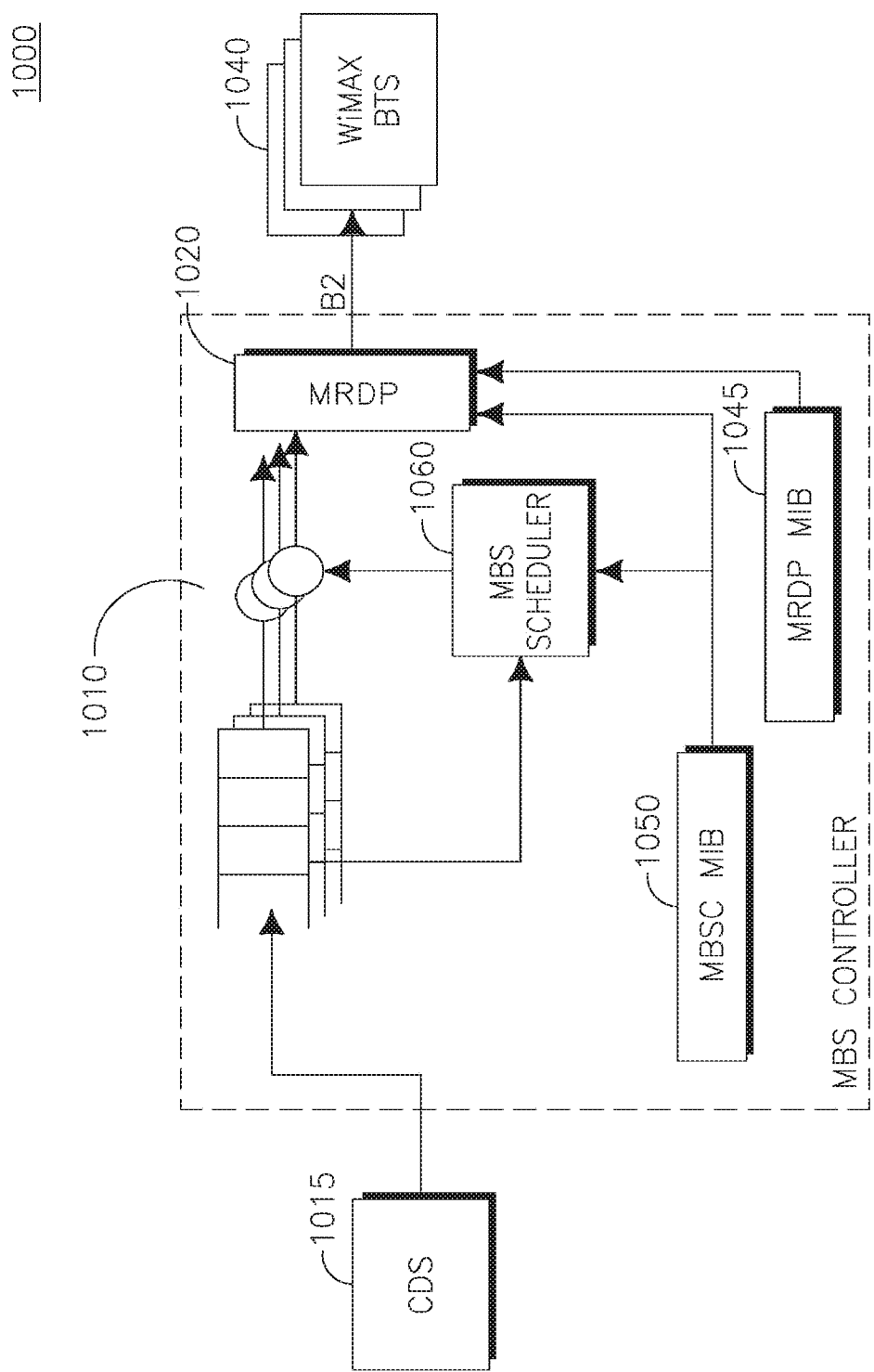
FIG. 10 shows an example functional block diagram of the MBSC in a normal operation state.

Referring now to FIGS. 9 and 10, an example state transition diagram 900 of the MBSC and a MBSC functional block diagram 1000 of a normal operation state 915 are shown. Upon power up, a MBSC 1010 starts in an idle state 905. In idle state 905, the MBSC 1010 ignores any incoming data streams from a CDS 1015. If the reset command indicates that a new configuration file may be transmitted, the MBSC 1010 transitions to a reset state 910 upon reception of the configuration file. The MBSC 1010 adjusts its parameters according to the configuration file. At this stage, the MBSC 1010 still ignores incoming traffic.

The next step is to acquire the time base and to establish a universal timing system. This enables the MBSC 1010 to specify the actual OFDM time division duplex (TDD) frames that may carry a specific MBS region. Successful acquisition and completion enables macro-diversity. The timing information may be acquired from the NTP server and the MBSC transitions to a normal operation state 915. Timing acquisition and synchronization process details are described herein.

In normal operation state 915, the MBSC 1010 buffers the incoming stream, builds the MBS region and forwards it to a MRDP-MBSC 1020. The MRDP-MBSC 1020 is a protocol situated in the MBSC 1010 that controls the connection of the MBSC 1010 to downstream elements. The MRDP-MBSC 1020 then sends the content of the MBS region to a ASN-GW (not shown) or base stations 1040 based on the configuration parameters specified in a MRDP MIB 1045.

Individual configuration parameters may change in the normal operation state 915 and the MBSC 1010 may gracefully adapt itself to the new set of parameters unless a graceful transition is not possible. In such a case, a reset indicator may be sent to the MRDP-MBSC 1020 and the MBSC 1010 enters a reset cycle. A reset indicator may contain an expected unavailability time period. The MBSC 1010 also periodically sends timing indicators and may notify the MRDP-MBSC 1020 of other actions such as the change of a parameter or transition to the idle mode 905, etc.

Upon receiving a new configuration file as the effective configuration file, the MBSC 1010 starts to update its MIB elements (collectively the MRDB MIB 1045 and MBSC MIB 1050) based on parameters in the new configuration file. Change of some of the configuration parameters may result in a software generated reset. The MBSC 1010 examines the updated configuration file before updating any parameters to verify if a reset may be required as a result of updating some configuration parameters. If a reset is required, the reset indicator may be issued and none of the parameters may change in the MIB before the reset. After the reset, the MIB elements may be updated with new elements from the configuration file.

In the normal operation state 915, the MBSC 1010 buffers packets received from the CDS 1015. A MBSC scheduler 1060 builds the MBS regions based on the configuration parameters stored in the configuration file. The MBS scheduler 1060 also manages the packet buffers and makes sure that at the beginning of each time diversity interval (TDI), the transmission delay (defined as the difference between the real-time protocol (RTP) time-stamp and over-the-air transmission time) for the first packet not yet included in a scheduled TDI is within the limits specified in the configuration file, and makes proper modifications to the outgoing rate accordingly. The built MBS regions may be forwarded to the MRDP-MBSC core process 1020.

In order to monitor the connection between the MRDP-MBSC 1020 and ASN-GW (not shown) or base stations 1040 in the normal operation state 915, both parties generate a keep-alive heartbeat signal. In transactions between the MBSC 1010 and the base stations 1040, the MBSC 1010 plays the role of the server and the base stations are the clients. The MBSC 1010 core sends regular timing indicators to the MRDP-MBSC 1020 and these indicators may be translated to heartbeat timing messages that may be sent to base stations 1040. The MRDP-MBSC 1020 monitors the heartbeat signal from base stations 1040 to maintain its own database of connected base stations. However, the MBSC 1010 core is unaware of such connections and only composes the MBS region based on the incoming traffic and configuration parameters and sends the MBS region to MRDP-MBSC 1020.

If the MBSC 1010 goes through a graceful reset cycle, it sends an indicator to the MRDP-MBSC 1020. The MRDP-MBSC 1020 in turn sends a message to connected base stations notifying them that it will become unavailable for a specified period of time. Base stations may add a random back-off time to this time period before trying to re-register with the MBSC 1010.

The MBSC 1010 may periodically update its internal clock with the NTP server. This is to avoid considerable timing drift. However, normal drift of internal timers in the MBSC 1010 may not affect the macro-diversity of the system as long as the drift is not so large that it prevents on-time delivery of packets to base stations.

Disclosed now are methods that may be implemented by the MBSC core and MBSC scheduler with regard to MBS frame construction. The issue of constrained scheduling, when there is a wide area MBS Zone constraining the scheduling of the local MBS Zone, and how the scheduling operation is impacted under such conditions, is also addressed. Details are presented for post scheduling MBS frame construction, low duty cycle (LDC) MBS MAP message structure, construction and schedule, and the provision of the information required by the BS for inclusion in downlink channel descriptor (DCD) messages, which may also be updated in the BS MIB via an element manager.

The MBS frame construction operation begins with reading stream and substream data from the queues of the de-multiplexed incoming content from the CDS, after deciding which packets for each substream will be transmitted in the next scheduled TDI. If so configured, an application packet cyclic redundancy check (CRC) may be added at the end of each of the read packets or packet fragments. The read packets, including the application packet CRCs, for each substream is then input into a Reed-Solomon (RS) encoding table and RS encoded. Next, RS encoded data scrambling, if applicable, is performed on the RS table. The data is then read out from the RS table, and the physical (PHY) packet data unit (PDU) CRC (if applicable) is added at the end of each media access control (MAC) PDU (a.k.a. PHY PDU payload). Lastly, a joint scheduling method is applied, so that all of the substreams comprising a stream are scheduled for consecutive transmission. The operation of the MBSC scheduler is controlled through the configuration parameters in the MBSC MIB.

Figure 11:
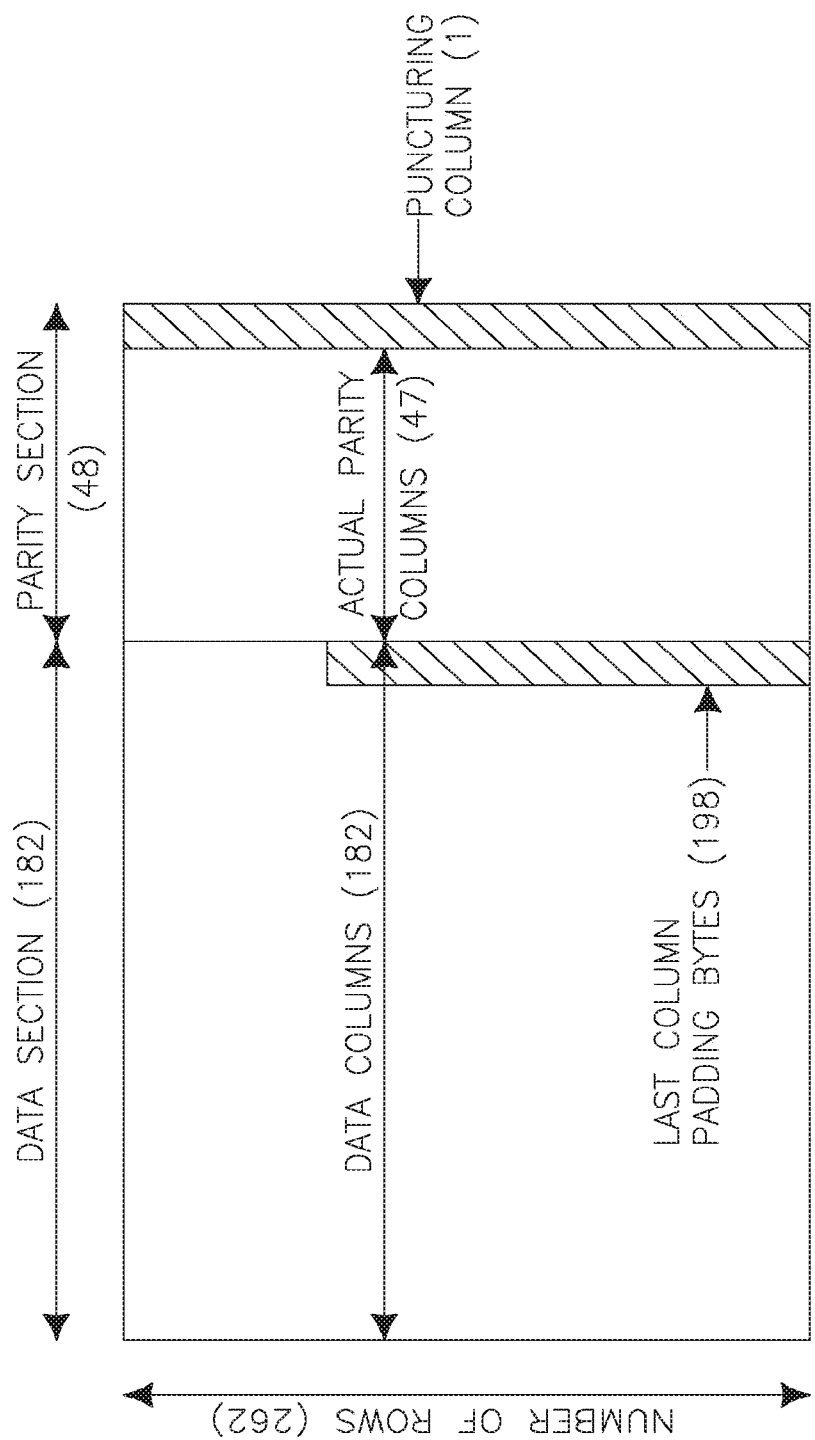
FIG. 11 shows an example structure of a Reed-Solomon (RS) table.
Figure 12:
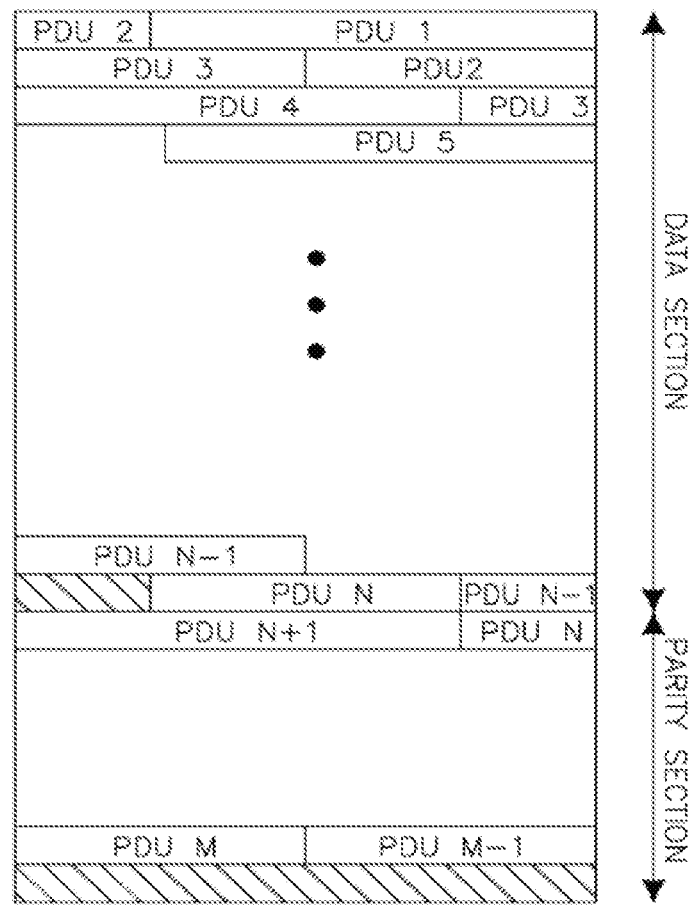
FIG. 12 shows an example diagram of media access control (MAC) packet data units (PDUs) extraction from the RS table.
Figure 13:
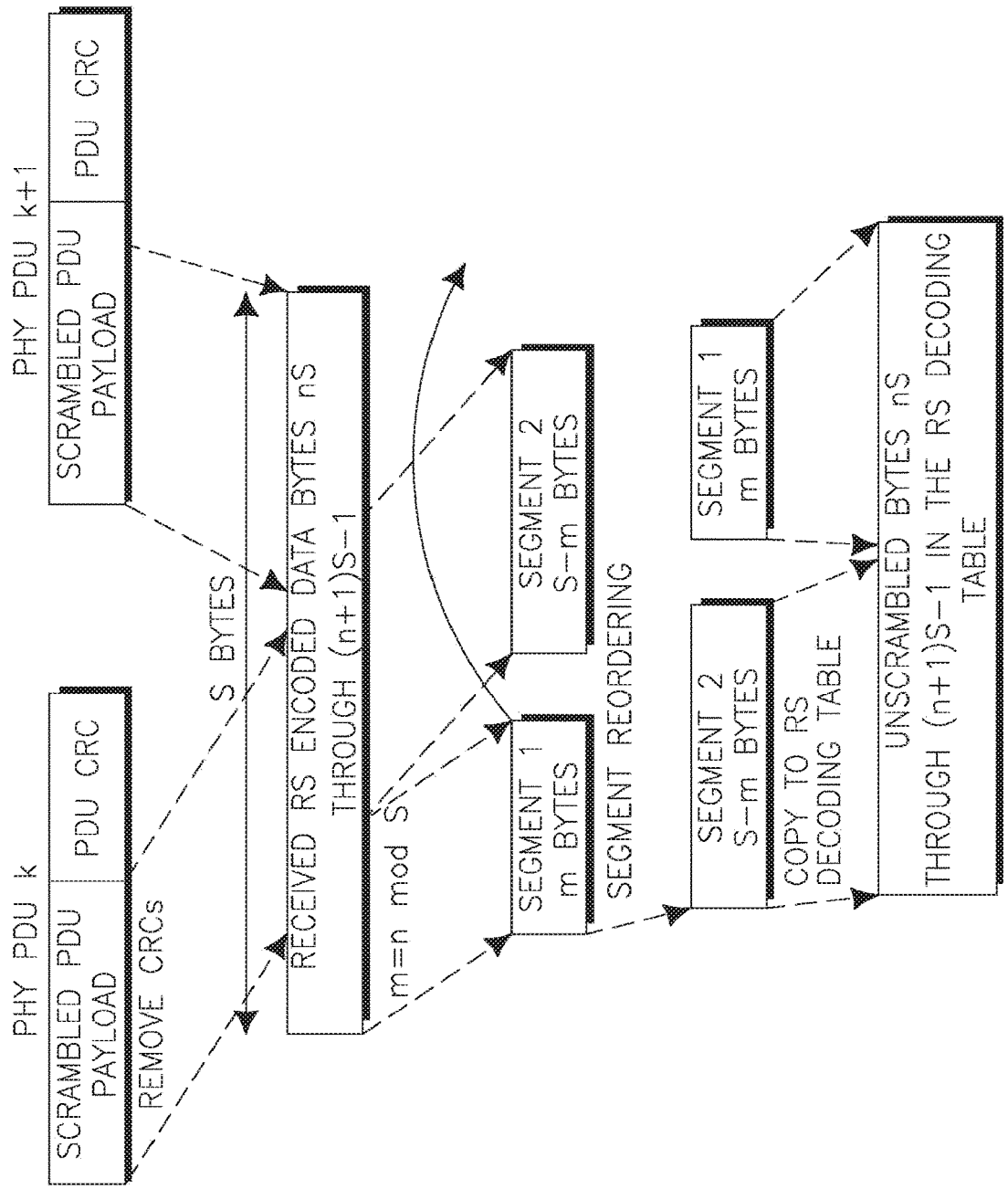
FIG. 13 shows an example diagram of a RS encoded data unscrambling method.

As stated above, RS is used for outer coding mode 1. Referring now to FIGS. 11-13, the outer coding mode 1 operation involves the use of a RS encoding table where each row is a RS codeword. Application data packets corresponding to a substream are written to separate RS encoding tables vertically, with one table for each substream. When a table column is completely full, the next data bytes are written by wrapping to the first row location in the next column of the table. A portion of the last column in the application data table portion of the RS encoding table may be left unpopulated. These unpopulated locations are referred to as "padding bytes", which have a value of 0x00 for RS encoding purposes.

After filling up the data section of the table, the parity section of the table may be filled by computing the RS parity on rows, and inputting the parity symbols (bytes) in the rightmost locations of the corresponding row.

The RS encoder in the MBSC may be capable of producing RS codewords of length up to 255 bytes with different possible combinations of systematic data and parity bytes. The encoder may be capable of producing codewords with any even number of parity bytes not exceeding 64, as long as the total length of the produced codeword does not exceed 255. When required to produce a codeword with an odd number of parity bytes, a codeword having an even number of parity bytes (one greater than the requirement) may be produced, and the last parity byte punctured (not included in the parity section of the RS table).

Every combination of systematic data length and parity length including the puncturing byte (if applicable) that is smaller than 255 bytes constitutes a shortened RS codeword. The data portion of a shortened RS codeword may be considered to be prefixed with an appropriate number of 0x00-valued bytes to bring the total size of the codeword to 255. Examples are discussed herein for RS encoding specifications and shortened codeword.

After the RS encoding is complete, RS encoded data scrambling is applied. The scrambling increment value is denoted by S and the first byte location in the table is denoted by 0. The scrambling operation proceeds as follows. Byte locations S through 2S−1 are read from the table. Next, the last byte from the read group is moved to the top of the group, and the re-ordered group of bytes is copied back into locations S through 2S−1 in the table. The process proceeds with groups of bytes of size S such that in the second step byte locations 2S through 3S−1 are scrambled, in the third step byte locations 3S through 4S−1 are scrambled, and so on. The scrambling procedure for each group depends on the group index. As explained above, for the first group (byte locations S through 2S−1), only a single byte is cyclically shifted from the bottom of the group to the top. Generalizing to group j, the (j mod S) last bytes of the group are cyclically shifted. For example, for the group of bytes from locations 2S through 3S−1, the two bytes from locations 3S−2 and 3S−1 are moved to locations 2S and 2S+1, respectively, while the rest of the bytes are shifted two locations downwards. Padding locations are skipped and not scrambled. If the last group of bytes in the table is smaller in size than S, this group may not be scrambled. Note that a scrambling increment setting of 0 signals that no scrambling may be performed.

After the RS encoded data scrambling is applied to the data in the table, extraction of the data from the table (MAC PDUs) and packing into PHY PDUs begins. The first PDU may be read starting from the upper left corner of the table (first byte of the first row of the table). The content of the PDUs is read vertically from the table such that consecutive bytes of the PDU are read from consecutive rows of the RS table. If a PDU reaches the last row of a column in the table, it wraps around and continues from the first row of the next column. PDUs may be read from the data section of the table first and then from the parity section skipping the padding bytes in the last column of the data section of the table (if applicable). If the last few bytes read from the data section of the table do not fill a PDU, the rest of it will be filled by bytes read from the parity section of the table. The last MAC payload byte in the last PDU is the last byte of the table (bottom right corner of the parity table). Mapping of data and parity bytes in the RS table to PDUs is illustrated in FIG. 11.

In one example, assume the total number of bytes transmitted in all allocations belonging to a particular substream is 60000 composed of 100 PDUs of size 600 bytes each. Also assume that each PDU has a 2-byte CRC-16 field which is added to the 598 byte payload from the RS table. Therefore there are 59800 bytes of information and parity bytes from the RS table. Assume the number of parity columns is specified as 47 and the number of data columns is 182 as shown in FIG. 11. The number of parity bytes in the encoded codewords must be even, and is therefore 48, with the last parity byte being punctured. The first 181 columns are filled with data. The last column in the data section is partially populated with padding bytes. The number of rows in the RS table is $$\text{Number of rows} = \left\lceil \frac{59800}{182+47} \right\rceil = 262.$$

The number of padding bytes in the last column of the data section of the table is Number of padding bytes=262×(182+47)−59800=198.

Therefore, the last 198 locations of the last column of the data section are padding bytes. FIG. 11 is a graphical sketch of the table in this example.

Referring specifically now to FIG. 12, the first 79 PDUs (excluding CRC) are then extracted from the data section of the RS table. The first part of the 80$^{th}$ PDU has 244 bytes and is extracted from the data section of the table. The next 198 locations, which are the last bytes of the data section of the table identified as padding bytes filled with 0x00, are skipped. The rest of this PDU, 354 bytes, is extracted from the parity section of the table. The last 20 PDUs (excluding CRC) are extracted from the parity section of the table.

An example of a RS outer coding protocol is now described. Each row of the outer code block is a RS codeword. RS code words may be generated on a GF(256) finite field with field generator polynomial $$p(x)=x^8+x^4+x^3+x^2+1.$$

The code generating polynomial is $$g(x) = \prod_{i=0}^{2\lceil p/2 \rceil - 1} (x+\lambda^i),$$

where $\lambda=2$ and p is the number of parity bytes.

The code word RS(N,K) represents a codeword of length N with K data bytes (including a possible padding byte). If N<255, the codeword is a shortened Reed-Solomon codeword. Note that the number of parity symbols, i.e., P=N−K, may always be an even number. If p, the desired number of parity bytes, is an odd number, a code word with P=p+1 parity bytes may be generated, and the last parity symbol may not be transmitted. Hence, N=K+2⌈p/2⌉. The RS codeword consists of K data symbols (the last of which may be a padding byte, equal to 0x00, which is not transmitted), and N−K parity bytes (the last of which might be punctured, and therefore not transmitted).

To generate a shortened RS codeword, the systematic bytes of the codeword may be prefixed with 255−N 0x00 bytes. The encoder generates a RS(255,255−N+K) codeword of length 255 and drops the leading 255−N 0x00 bytes. The shortened codeword will be the last N bytes of the codeword which include the original K systematic bytes and P=N−K parity bytes. If the number of desired parity bytes for transmission p is an odd-number, the last byte will be punctured and will not be transmitted.

For example, assume the following sequence of 16 data bytes:

0x08 0x05 0x67 0xBC 0xC5 0x91 0xDA 0x8B 0xFE 0xE8 0xC6 0xDE 0x91 0x1A 0x15 0x26

To generate a shortened RS codeword with three parity bytes, the encoder first generates a shortened codeword with four parity bytes and then drops (puncture) the last generated parity byte. To generate a shortened codeword with four parity bytes, the encoder first prefixes the sequence with 235 bytes of 0x00 and then generates the RS(255,251) codeword by encoding the 251 byte sequence which appends 4 parity bytes. The four generated parity bytes are 0x55 0xE0 0x2A 0xFA. The resulting shortened codeword with three parity bytes (total length 19 bytes) is:

0x08 0x05 0x67 0xBC 0xC5 0x91 0xDA 0x8B 0xFE 0xE8 0xC6 0xDE 0x91 0x1A 0x15 0x26 0x55 0xE0 0x2A, where the fourth generated parity byte, 0xFA, has been punctured.

An example of RS encoded data scrambling is explained in the context of receiver unscrambling. The outer-encoded RS data requires unscrambling at the MBS receiver whenever the scrambling increment is not set to zero. The process of unscrambling is illustrated in FIG. 13 for a particular set of received data bytes. If the PHY PDUs include CRC protection, the CRC check may be performed over the scrambled data. Before the unscrambling process begins, any such CRCs may be removed.

Unscrambling is performed over S received RS encoded data bytes at a time. When unscrambling received bytes nS through (n+1)S−1 the length of the scrambling segment is given by m=n mod S. To unscramble, the first in bytes of the set may be removed from the head of the set and appended to the end of the set instead. The unscrambled set of bytes is then ready to be copied to location addresses nS through (n+1)S−1 in the RS decoding table.

Disclosed now is the building the substream TDI data. First, the stream time-base establishment needs to be achieved. The application packets for each stream arrive with an RTP time-stamp in the header. Upon start of the application program, the MBSC may establish an offset between the observed time-stamp and universal time coordinated (UTC) time obtained from the NTP server. This offset provides the benchmark for mapping application packets to be scheduled in a TDI, so that delay jitter is minimized, resulting in avoidance of service interruption and any potential buffer overflows at the base station (BS). The desired offset is a function of specific network deployment. Therefore, there may be a parameter enabling configuration of the desired offset, Target Playback Delay, which applies to all streams of the zone. In essence, this parameter specifies what the minimum time difference between the playback time of the last application packet included for scheduling in the current TDI, and the playback time of an application packet being transmitted currently over the air may be.

Disclosed now is the substream TDI data construction. For illustrative purposes only, it is assumed that outer-coding mode 1 (RS coding) is used. The key parameters for outer-code block construction utilizing outer-coding mode 1 are now disclosed first to set-up the substream TDI data construction method. The first parameter is the Target Playback Delay, which is in seconds.

The number of parity symbols field indicates the number of parity bytes in each of the RS codewords included in the RS code block associated with the substream in the given TDI. Note that if this number is odd, a parity symbol from the generated codeword is to be punctured as explained herein.

The target number of data symbols field indicates the number of data bytes in each of the RS codewords included in the RS code block associated with the substream in the given TDI. Note that the outer-code block construction method (below) allows for cases where the actual number of resulting data symbols in each of the codewords is slightly smaller than this target value. In addition, note that if a partially padded data column is included in the substream, the actual number of data bytes in a codeword is one less than the actual number of data columns in the last few codewords, where padding occurs. For encoding purposes, these padding locations are populated with 0x00.

The minimal row increment field is the number of rows in an RS block may be configured to be an integer multiple of the Minimum row increment. If this is set to 1, any integer number of rows is allowed.

The TDI Transmission Bursts field is the number of interleaved transmission data bursts for each substream in each TDI. This parameter may be applied to data transmission so that the data transmission is transmitted in bursts as uniformly as possible within the TDI.

The Traffic Class Identifier field is an index that maps, through a table in the MBSC MIB, the substream to the target modulation code scheme (MCS), repetition configuration, inner-forward error correction (FEC) block size, PHY PDU CRC configuration, application packet CRC configuration, RS encoded data scrambling type (fixed/multiple of number of block rows), RS encoded data scrambling value (bytes for fixed/row number factor for multiple of number of block rows) . . . (Number of parity symbols, Target Number of data symbols, Minimum row increment).

Disclosed now is an example of an outer-code block construction method utilizing outer-coding mode 1. First, the buffered packets corresponding to the substream that have an RTP timestamp indicating that they are to be included in the TDI being scheduled, including a possible fragment of a packet partially transmitted in the previous TDI, are identified. For application packet CRC (if applicable) and the 2 byte location indication for each packet; add 4 bytes to account for the fixed sized packet convergence field set, and count the total number of bytes (denote $N_0$). Multiply $N_0$ by the target number of table columns (defined: Number of Parity Symbols plus Target Number of Data Symbols) and divide by the target number of data symbols to get a rough estimate of the minimal total MAC payload, $N_1$. Divide $N_1$ by the number of transmission bursts per-TDI (denote $N_2$).

Find in the look-up table (LUT) for the required MCS, FEC block size and inner-FEC block CRC configuration, the smallest symbol group configuration that will accommodate $N_2$ MAC payload bytes in a burst. Denote by $N_3$ the number of accommodated MAC payload bytes per-burst. Multiply $N_3$ by the required number of transmission bursts per-TDI (denote $N_4$). Divide $N_4$ by the required row multiple for the table (denote $N_5$). Find the number of table rows with the target number of table columns that is required to fit $N_5$ bytes (denote $N_6$). Compute the actual number of parity bytes by multiplying the target number of parity columns by $N_6$ and then by the minimum row increment (denote $N_7$). Compute $N_4$–$N_7$ (denote $N_8$). If $N_0$ is larger than $N_8$, go back to the multiply $N_3$ step, with $N_3$ corresponding to the larger allocation that is closest in size to the previous one.

Select additional packets from the substream queue, such that the total number of packet bytes, packet fragment bytes, packet CRC bytes, and location indication bytes is equal to $N_8$. Write all data to a data table with R=(minimum row increment)×$N_6$ rows and D=ceil($N_8$/R) columns, and RS encode, adding number of parity symbols parity bytes to each row. Apply RS encoded data scrambling as explained herein. Extract the data from the table, and generate PHY PDUs as explained herein. Store the PHY PDUs in the scheduling buffer awaiting MBS frame construction.

Note that the example method uses no allocation padding bytes if $N_0$–$N_8$ is greater than 6. If the remaining space is 6 bytes or less, these locations in the RS table may be padded with 0x00 bytes (RS padding), and a fill packet may be included in the PHY PDU. For example, if the packets that need to be transmitted in the next TDI is a total of 45679 bytes in 51 packets (including a packet fragment) then assume packet CRC-32 is used. Adding a total of 6 bytes per-packet and 4 more bytes for the fixed overhead, then $N_0$=45989. If it is assumed that the target outer-code configuration is RS(255,225), then multiplying by 255 and dividing by 225, $N_1$=52120.9. If the number of required transmission bursts is 4, then $N_2$=13030.2.

Assume the required MCS is 16-QAM, code rate 1/2, inner-FEC CRC-16 is used, and that the target FEC size is 120 bytes. Also assume in this case the permutation is partial usage of the subchannels (PUSC), and the number of subchannels is 30. In this case, a symbol group is 2 OFDMA symbols, and a symbol group contains 1440 modulation symbols, which with 16-QAM, rate 1/2 translates to 2880 bits or 360 bytes. Therefore, each symbol group may carry exactly 3 FEC blocks of length 120 bytes each, and with the CRC configuration above, the MAC payload carried in each symbol group is 354 bytes. The entries in the LUT will therefore show 354 bytes with a single symbol group, 708 bytes with 2 symbol groups, and so on. Therefore, 37 symbol groups are needed for the N2 bytes, and $N_3$=13098. Multiplying by 4, $N_4$=52392.

Assume the required row multiple is 8 then $N_5$=6549. Dividing by the codeword length, 255, the required number of rows is $N_6$=26. The actual number of parity bytes is $N_7$=30×26×8=6240. $N_8$=$N_4$–$N_7$=46152. Note that $N_0$ is not larger than $N_8$, therefore, no need to go back to the multiple $N_3$ step.

Assume the next packet in the queue is 527 bytes long. As the remaining space is only 163 bytes ($N_0$–$N_8$), only a fragment of this single packet needs to be added to the transmitted payload in the current TDI. As there is a 6 byte overhead (packet CRC and location indication) for each packet or packet fragment, the first 157 bytes of this packet will be included for transmission in the current TDI. The outer-code block structure is therefore 208 rows, 222 data columns, 30 parity columns. The last data column has a padding byte in the last 24 rows.

Assume the RS encoded data scrambling configuration is defined as a multiple of the actual number of rows in the block, and that the value is set to 1, meaning that a table column worth of data is scrambled at a time, starting with a cyclic shift of one byte for the second column. Note that the 198 data bytes in the last data column are combined into a set with the first 24 bytes of the first parity column, to which scrambling is applied. Similarly, for the rest of the parity columns, except the last one, two fragments of consecutive columns are combined into a set to be scrambled. The remaining fragment of the last parity column is not scrambled, and left unchanged.

Note that the total number of bytes in the table is 52392, which are packed into 444 inner-FEC blocks of length 120 bytes each (after CRC-16 being appended). The 444 FEC blocks are transmitted in 4 bursts, 111 FEC blocks in each. As 3 FEC-blocks fill exactly a symbol group, 37 symbol groups are required per-burst. The data portion of the table is organized as follows: 4 packet convergence related bytes at the beginning, followed by 52 location indicators for the 52 application packets contained in the table—a total of 104 bytes. Next the 51 packets, each appended with CRC-32, are included, for a total of 45883 bytes. Last, the 157 byte packet fragment, along with the CRC-32 for a total of 161 bytes, is included. The total over all the above amounts exactly to 46152 bytes, which is the number of data bytes in the table.

Disclosed now is an example method for MBS Zone Coexistence or constrained scheduling. In the case of a hierarchical MBS Zone configuration in the network, there may be a wide coverage area zone which transmits the same content in a synchronous fashion over the wide area zone. In addition, a fraction of the base stations in the area may constitute a local area zone, which differs from other local area zones in the same wide area zone. This situation is depicted in FIG. 6.

In such a deployment, the local area zones may inherit TDI duration and TDI timing synchronization from the wide area zone, such that TDIs for both zones are comprised of identical sets of consecutive OFDMA frames. For each of the zones, in the MBSC MIB, there may be configured a Numbering System Definition Vector (as discussed below), which is tied to the schedule, and may therefore be changed as the relative MBS transmission rate changes as indicated by the schedule. The typical configuration of the patterns includes the overall allocation included in the numbering system suitable to support the maximum allowable MBS rate for the zone. Numbering systems corresponding to different zones may not share OFDMA frames. For example, if the wide area zone defines a numbering system with optional MBS region transmission in all odd indexed frames in the TDI (for example, numbering pattern vector <0,12,0, 10>), the local zone may have zero symbols in the numbering system for odd indexed frames. For example, a pattern with an optional allocation in every frame index that is divisible by 8 (for example, numbering pattern vector <14, 0,0,0,0,0,0,0>), but not a pattern with an optional allocation in every 8th frame, such that the index of the frame is 8k+3, k=0, 1, 2, . . . (for example, the numbering pattern vector <0,0,0,14,0,0,0,0> is not allowed).

Note that since data scheduling for each MBS Zone is confined to the numbering system of the Zone, this structure assures avoidance of any scheduling conflicts for the data. The only other element being scheduled in the MBS Zone is the LDC MBS MAP. The location of transmission, repetition period, and maximum allowable size of the LDC MBS MAP may be static in nature and may be schedule dependent. The LDC MBS MAP may be scheduled for each Zone in frames with a non-zero MBS numbering system (MNS) allocation, outside of the numbering system. For example, if the numbering pattern for the MNS is <0,12,0,10>, the LDC MBS MAP may be scheduled in a frame having 10 MNS symbols. In such a case, the last 10 symbols of the downlink (DL) sub-frame may be the MNS symbols, and the LDC MBS MAP may be scheduled for transmission in symbols immediately preceding the MNS symbols, such that the MBS region of the frame may exceed 10 symbols in this frame.

Disclosed now is an example stream scheduling method. The steam scheduling method defines the mapping of symbol groups of substreams in a burst to allocations within the MNS. Two criteria drive the design and implementation of the method. The first criteria is to bundle the bursts corresponding to all the substreams comprising a stream as closely together as possible to promote client station power savings. Defined more concisely, the criteria is to have all the substreams of each stream transmitted such that the span in OFDMA frames is minimized within the burst cycle. The second criteria is to schedule transmissions within the MNS such that no allocations will be wasted, and any unused MNS symbols will be returned to the two-way traffic scheduled for unicast downlink use. These two criteria may be obtained without violating uniform burst transmission sizes or burst number requirements.

Note that the substream TDI Data Construction method described herein may result in an amount of information that requires equal size allocation in each of the constituent bursts, occupies an integer number of symbol groups in each of the bursts, and the number of symbol groups occupied by the data burst is always divisible by the fundamental allocation unit associated with the traffic class corresponding to the substream. This fundamental allocation unit is also included in the MBSC MIB as one of the attributes of the traffic class. The fundamental allocation unit may be a function of the MCS, repetition configuration and the inner-FEC size associated with the class. This number represents the smallest number of symbol groups that exactly fits an integer number of PHY PDUs. In the example discussed herein, the MCS is a 16-quadrature amplitude modulation (QAM) coding rate 1/2, with no repetition, and the PHY PDU size is 120 bytes. As this MCS allows scheduling 360 bytes in a symbol group with PUSC permutation, three PHY PDUs fit exactly in each symbol group. Therefore, the fundamental allocation unit is in this case 1 symbol group. With all other parameters unchanged, if the PHY PDU size was defined to be 600 bytes instead, the fundamental allocation unit would be 5 symbol groups, as 3 PHY PDUs fit exactly into 5 symbol groups, and no smaller number of PHY PDUs fits exactly into an integer number of symbol groups. Another objective for the method is to minimize the number of segment allocation patterns describing each of the substreams. In most cases, efficient scheduling is possible with a single allocation pattern definition for most substreams.

Discussed now is an air interface message construction. Construction of the LDC MAS MAP is first presented. The MBSC is responsible for the construction of the LDC MBS MAP message for each TDI. In order to deliver the LDC MBS MAP in a timely fashion (i.e., in the order of over the air transmission), interleaved with data-bearing OFDMA frames, the scheduling procedure of each TDI may be carried by the MBSC at least one full TDI duration before the constructed data bearing frames are forwarded to the MRDP-MBSC. This is required since although constructed MBS frames are forwarded much later, the LDC MBS MAP describing the allocations is transmitted in the previous TDI, and its content depends on the schedule for the next TDI.

The LDC MBS MAP structure contains information that may be divided into several different categories. The first category is information that is common to all streams in the MBS Zone, and is therefore needed by any receiver attempting to receive any of the streams delivered in the MBS Zone. Note that static and relatively static parameters are either resident in the client station MIB, in which case they may be delivered through the application layer driven MBS guide (MBSG), or are received in the DCD message on a low frequency update basis. Although the LDC MBS MAP is designed to provide MBS Zone information that changes on a TDI time scale, that might not be the case in all realizations. In other words, some parameters that might change on a TDI basis and are therefore carried in the LDC MBS MAP might under some conditions and implementations be very static. However, for the sake of uniformity, these parameters are carried in the LDC MBS MAP, regardless of having a relatively static nature.

The second category is the stream description information. This information is unique to the stream, and combined with the first portion, provides sufficient information for successful reception of the stream, regardless of the successful reception of stream description information for other streams in the MBS Zone. Each stream descriptor may contain one or more substream descriptors, and each substream descriptor may contain information required to receive the substream, including PHY parameters, allocation information and outer-coding information.

Described now is the TDI Descriptor in the DCD. The TDI Descriptor describes a set of parameters of the MBS system, and is transmitted in the DCD message. The base station sends a different TDI Descriptor corresponding to each MBS Zone. The content of this message is appended by a CRC-16 checksum. If the CRC-16 checksum does not match, this message may be discarded. The structure of the TDI Descriptor IE is specified in Table 1.

TABLE 1

| TDI Descriptor IE | | |
|---|---|---|
| Field | Size | Notes |
| TDI Descriptor IE( ) { | | |
| MBS Zone ID | 11 bits | |
| Permutation Type | 1 bit | 0b0 - FUSC |
| | | 0b1 - PUSC |
| Embedded MAP Present | 1 bit | 0b0 - not present |
| | | 0b1 - present |
| TDI Number of frames | 12 bits | |
| First Frame Offset | 12 bits | |
| LDC MBS MAP DIUC | 4 bits | |
| LDC MBS MAP Frame offset | 11 bits | |
| LDC MBS MAP Symbol offset | 8 bits | |
| LDC MBS MAP Repetition count | 3 bits | |
| LDC MBS MAP Repetition period | 12 bits | |
| LDC MBS MAP Max width | 5 bits | |
| CRC-16 | 16 bits | |
| } | | |

In Table 1, the MBS Zone ID identifies the MBS Zone described by this TDI Descriptor. The Permutation Type specifies the type of permutation of the MBS Zone. For example, if this field is set to 0b0, a full usage of the subchannels (FUSC) permutation may be used for the entire MBS Zone including the LDC MBS MAP. If the field is set to 0b1, a partial usage of the subchannels (PUSC) permutation may be used.

The Embedded MAP Present specifies whether the embedded MAP option is applied in this MBS Zone. For example, if equal to 0b1, all streams may have the MAP information embedded in the stream data. The TDI Number of frames is the number of frames in each TDI of this MBS Zone. This number may remain constant from TDI to TDI. The First Frame Offset is the number that specifies the First Frame Offset of the next TDI from the frame carrying the DCD message. For example, if the DCD is transmitted in frame number 100 and the First Frame Offset is 50, the first frame of the next TDI is frame number 150.

The LDC MBS MAP DIUC specifies the modulation and coding of the LDC MBS MAP. The mapping from DIUC values to modulation, coding and repetition specifications can be found in Table 5. The LDC MBS MAP Frame offset is the OFDMA frame offset of the location of the first instance of the LDC MBS MAP within this descriptor from the beginning of the TDI.

Figures 14A, 14B:
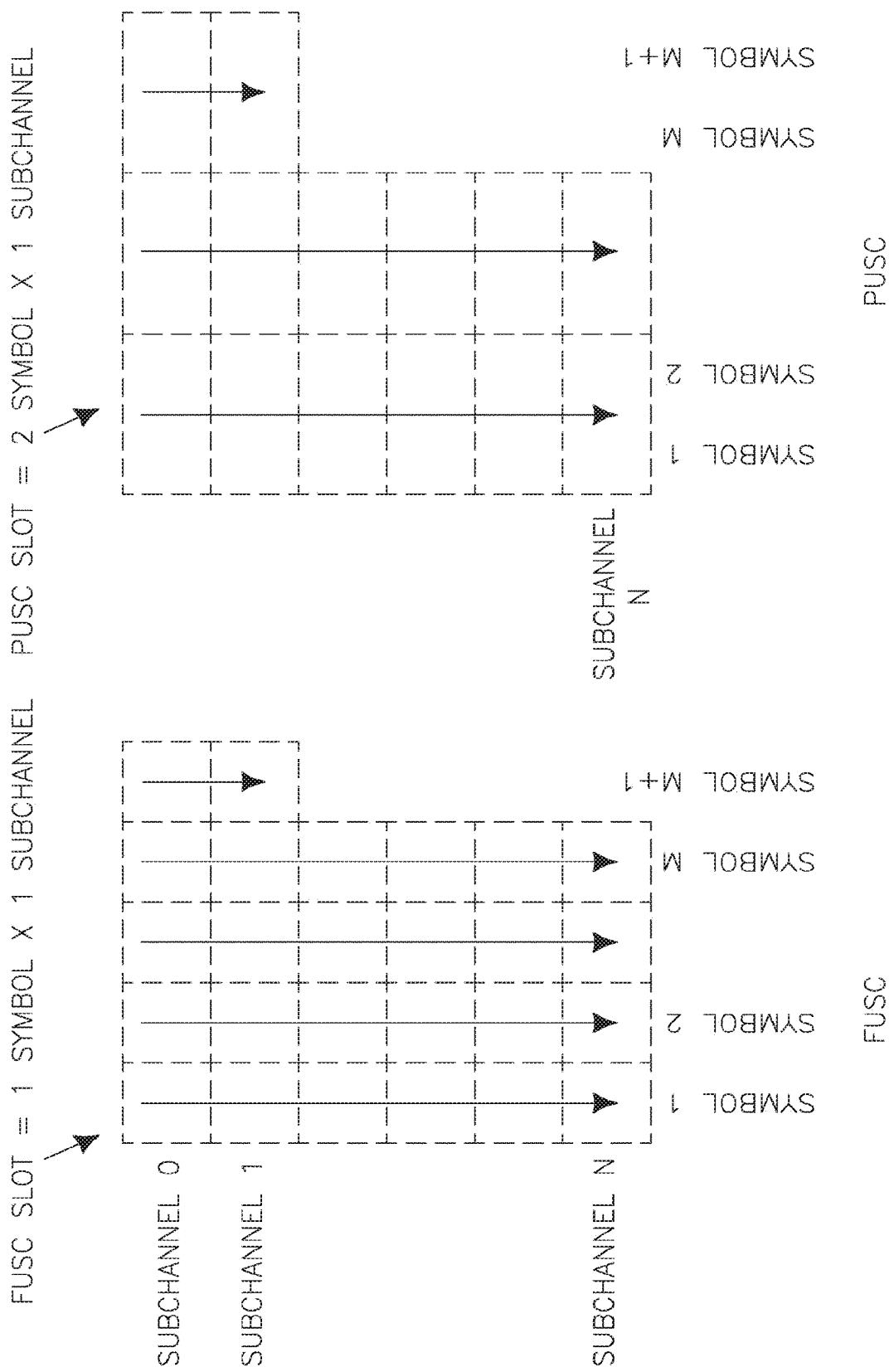
FIGS. 14(*a*) and (*b*) show example structures of allocations for low duty cycle (LDC) multicast broadcast service (MBS) MAP in MBS Zones with full usage of the subchannels (FUSC) and partial usage of the subchannels (PUSC) permutations.

The LDC MBS MAP Symbol offset specifies the symbol offset of the location of the LDC MBS MAP within frames that contain the LDC MBS MAP. The LDC MBS MAP may start at the first slot of the symbol identified (Subchannel 0) and may occupy completely a number of OFDMA symbols and partially some other symbols. If the LDC MBS MAP does not fill up an integer number of symbols, the last symbol (in case of an FUSC MBS Zone) or the last symbol pair (in case of a PUSC MBS Zone) will be partially used. In such a case, the LDC MBS MAP occupies a contiguous group of slots at a consecutive group of subchannels starting from the first subchannel. See FIGS. 14(*a*) and (*b*) for examples of an LDC MBS MAP partially occupying a number of symbols. The unit of assignment in each case is one slot. A slot is defined by one symbol in one subchannel for FUSC and 2 symbols by one subchannel for PUSC permutation.

The LDC MBS MAP Repetition count specifies the number of times the LDC MBS MAP described in the current descriptor repeats in the TDI. The LDC MBS MAP Repetition Period may be relevant if the Repetition count is greater than unity and specifies the period of repetition of OFDMA frames in OFDMA frames. The LDC MBS MAP Max width provides an upper bound on the size of the LDC MBS MAP in OFDMA symbols. This information could be used by receivers for first LDC MBS MAP reception upon network entry or re-entry.

Discussed now are example methods for packet convergence. In particular, a description of the packet delineation information and the packet delineation protocol are presented.

The Packet Convergence Protocol, also referred to as the Packet Delineation Protocol, is responsible for enabling delivery of packets in the original format to the application layer after all lower layer protocols and procedures have been applied to completion. Moreover, the Packet Convergence Protocol is responsible for adding proper signaling to the stream required for reconstructing application layer packets; this information is referred to as "Packet Delineation Information".

Service data units (SDUs) are first classified. This pertains mainly to the access service network (ASN) side. The MBSC is responsible for classifying received packets into different (virtual) buffers. Each buffer will contain application layer packets classified for a substream comprising one of the streams in the MBS Zone. Each application packet arriving at the ASN may be identified with a 12-bit Stream ID and/or a 4-bit Substream ID identifying the substream of the stream.

The Packet Convergence Information may identify boundaries of application layer packets in substreams of a stream. It may furthermore identify whether application layer packets are appended with a CRC. The Packet Convergence Information is tightly coupled with the Outer Coding Mode. This description specifies the Packet Convergence Information for Outer Coding Mode 1 (RS Coding), for example. The Packet Convergence Information for other modes may take a different form.

The Packet Convergence Information for Outer Coding Mode 1 may be transmitted as the first bytes of the substream. The Packet Convergence Information specifies the Packet Convergence Protocol parameters for the substream in the current TDI. Table 2 identifies specific parameters for this example.

TABLE 2

Packet Convergence Information

| Field | Size | Notes |
|---|---|---|
| Packet Convergence Information( ) { | | |
| Reserved | 18 bits | |
| Packet CRC | 2 bits | 0b00 - No CRC |
| | | 0b01 - Reserved |
| | | 0b10 - CRC-16 |
| | | 0b11 - CRC-32 |
| First Packet | 2 bits | 0b00 - Full Packet |
| | | 0b01 - Fragment Packet |
| | | 0b10 - Fill Packet |
| | | 0b11 - Reserved |
| Last Packet | 2 bits | 0b00 - Full Packet |
| | | 0b01 - Fragment Packet |
| | | 0b10 - Fill Packet |
| | | 0b11 - Reserved |
| Number of Substream Packets | 8 bits | |
| For(i=1; i<=N; i++) { | | N = Number of Substream Packets |
| $i^{th}$ Packet Location Indicator | 16 bits | |
| } | | |
| } | | |

The Packet CRC field indicates the use of the application packet CRC. If this field indicates that packet CRC is used, the last few bytes of each application packet extracted from the Reed-Solomon table are the CRC. If CRC-16 is used, the last two bytes of the packet are CRC-16 bytes of the application packet including all its headers. If CRC-32 is used, the last four bytes of the packet are CRC-32 bytes of the application packet including all its headers. The Packet CRC field applies to all packets in the table, including the Embedded MBS MAP information element (IE). Although this message has its own CRC, if the Packet CRCs of their corresponding substreams indicate that a certain form of CRC is present, the packet CRC may be present and computed over the entire content of the IEs including their own CRC-16 field. CRC procedures are defined below. If a packet is fragmented across consecutive TDIs, each fragment of the packet follows the CRC policy of the TDI it is transmitted in. A description of fragmented packets is also presented below.

As stated, different CRC options are used in the MBSC. The first one is CRC-16, which may be calculated based on the CRC-16 CCITT as defined in ITU-T Recommendation X.25, for example. Illustratively, the CRC-16 for the 4-byte sequence 0x12 0x34 0x56 0x78 is the two-byte sequence 0x30 0xEC. Another option is the CRC-32, which may be calculated based on the CRC-32 IEEE802.3 as defined in International Standard ISO/IEC 13818-1, for example. Illustratively, the CRC-32 for the 4-byte sequence 0x12 0x34 0x56 0x78 is the four-byte sequence 0xDF 0x8A 0x8A 0x2B.

An application packet may be fragmented into two (or more) fragments each transmitted in the same substream of consecutive TDIs. The first fragment of the packet may be the last packet of the substream in a TDI and the last fragment may be the first packet of the substream in a subsequent TDI. If packet fragmentation is applied to the first substream of a stream, the last fragment of the packet is the first packet after the Packet Convergence Information bytes and, if applicable, the Embedded MBS MAP packet.

If a packet is fragmented across consecutive TDIs, each fragment of the packet follows the CRC policy that applies to unfragmented application packets in the substream it is transmitted in, so that a CRC (if applicable) is appended to each fragment. The Packet Convergence Information parameters are defined below.

A First Packet field identifies the status of the first packet of the substream. If this field is set to 0b00, the first packet in the substream is a complete un-fragmented packet. If this field is set to 0b01, the first packet is a fragment of a packet that had another fragment transmitted in the previous TDI transporting information for this substream. If this value is set to 0b10, the first packet of the substream may be a Fill Packet. The first or the last packet of a table may be a Fill Packet as indicated by the Packet Convergence Information bytes. Fill Packets may not be passed to the application layer. A Fill Packet may not appear at the beginning of a table containing an Embedded MBS MAP packet.

Last Packet is a field that identifies the status of the last packet of the substream. If this field is set to 0b00, the last packet in the substream is a complete un-fragmented packet. If this field is set to 0b01, the last packet is a fragment of a packet. If this value is set to 0b10, the last packet of the substream is a Fill Packet as discussed above. The $i^{th}$ Packet Location Indication field identifies the location of the first byte of the packet in the RS table.

The Number of Substream Packets field identifies the total number of packets transmitted in the substream. This includes the Embedded MBS MAP IE packet (if applicable), application data packets, fragmented packets and possible Fill Packets. A value of 0x00 may be considered as 256.

Figure 15:
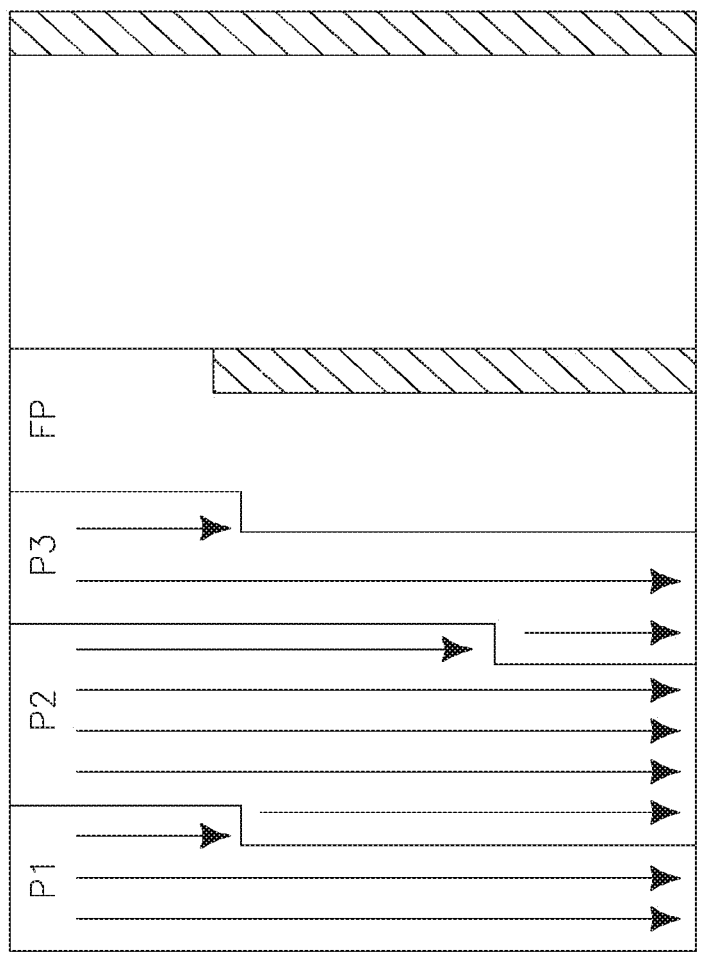
FIG. 15 shows an example of packet locations in a RS table.

Referring now to FIG. 15, Packet Location Indicators for Outer Coding Mode 1 are now discussed. Location Indicators in mode 1 are defined as the byte index of the location of the first packet byte in the RS table. The Location Indicator of the first byte of the table is 0x0000 and the Location Indicator sequentially increments in each row of the table until the last row of the table. The Location Indicator also increments from the last row of a column to the first row of the next column of the table. Note that the highest possible byte index addressable by a 2-byte indicator is 65535. With the restriction of not allowing application packet lengths to exceed 65535, a wrap-around may be used in cases where more than 65536 bytes need to be addressed in the application data section of a RS table. As such, every time a higher location indicator is followed by a lower location indicator, 65536 may be added to the address to identify the actual location.

An application data packet may be written to increase Location Addresses within the boundary of a table. If the application data packet does not finish in a column, the rest of the packet may be written to the next column of the table in the increasing Location Address order. A table may contain Fill Packets that may not be delivered to the application layer.

For example, consider a RS table associated with the first substream of a given stream where the number of data bytes in each row is 200. Assume the table contains 150 rows. Furthermore, assume that the table contains 50 padding bytes (the last byte in each of the last 50 rows).

Assume the TDI Descriptor in the DCD signals that the Embedded MBS MAP is present in the substream. Moreover, the Packet Convergence Information indicates that the substream contains 13 packets. The first packet in this table following the Packet Convergence Information is the Embedded MBS MAP message. Note that in this case the data section of the table contains less than 65536 byte locations.

Assume the Packet Convergence Information for the substream indicates a Last Packet field set to 0b10 and the Packet Convergence Information indicates that each packet is appended by a CRC-32. The first packet in this substream is the Embedded MBS MAP message. The last packet in the table is a Fill Packet. The remaining eleven packets are application data packets and may be delivered to the application layer.

Note that the Packet Convergence Information occupies 4+2×13=30 bytes, or Location Addresses 0x0000 through 0x001D. Therefore, the Embedded MBS MAP start address is 0x001E. Assume the 13 Location Indicators in the table are 0x001E, 0x01A0, 0x0200, 0x0700, 0x0850, 0x1300, 0x2000, 0x3000, 0x4000, 0x5000, 0x6000, 0x7000, and 0x7400.

The length of the first packet including packet CRC bytes is 0x0183=387. The last four bytes are CRC-32 and the remaining 383 bytes are the Embedded MBS MAP message. The packet starts at the $31^{st}$ byte of the first column (Location Address 0x001E=30) and the last byte of the packet is the $116^{th}$ byte of the $3^{rd}$ column of the table.

The next packet is 96 bytes long including 4 CRC bytes. The next 4 packets are 1280 bytes, 336 bytes, 2736 bytes, and 1792 bytes long, respectively, and are followed by 5 packets of length 4096 bytes each. Note that all packets include a 4-byte CRC field. The length of the next packet is 0x0400=1024 bytes including a 4-byte CRC field. This packet starts at the $23^{rd}$ byte of the $192^{nd}$ column and continues to the $146^{th}$ byte of the $198^{th}$ row of the table.

The last packet in the table is a Fill Packet and starts at Location Address 0x7400. Location Address 0x7400 is the $147^{th}$ byte of the $198^{th}$ column. The Fill Packet continues to the last byte of the data section of the Reed-Solomon table before the start of the padding bytes which is the $100^{th}$ byte of the $200^{th}$ column of the table.

Disclosed now is an example method for an Embedded MBS MAP protocol. Embedded MBS MAP may be transmitted in the first substream of a stream and carries information required for decoding that particular stream in a TDI with an offset of two TDIs. Therefore, if the receiver is only interested in continuing to receive the same stream, it may avoid decoding the LDC MBS MAP as long as it successfully receives the Embedded MBS MAP for the stream of interest. The client station however needs the LDC MBS MAP to switch between different streams and in case the Embedded MBS MAP for the stream is received with errors. If the Embedded MBS MAP in a TDI is not decoded correctly, the receiver could use the LDC MBS MAP in the next TDI to decode the Stream Descriptor IE.

The Embedded MBS MAP transmitted in a particular TDI for a given stream may describe the same stream in a TDI with offset of two (the TDI after the next TDI). If the Embedded MBS MAP is transmitted in a TDI, it may be the first packet after the Packet Convergence Information bytes of the first substream of the stream.

The presence (or lack thereof) of the Embedded MBS MAP is indicated by a flag in the DCD message as described herein. If the Embedded MBS MAP flag is set, the first packet in the first substream of the stream after the Packet Convergence Information bytes may be the Embedded MBS MAP message for the entire stream. If the Embedded MBS MAP is transmitted in the substream in TDI M, it describes the entire stream in TDI M+2 (the TDI transmitted with offset of two).

TABLE 3

Embedded MBS MAP IE

| Field | Size | Notes |
|---|---|---|
| Embedded MBS MAP IE( ) { | | |
|    Reserved | 5 bits | 0b00001 |
|    Length | 11 bits | |
|    Reserved | 2 bits | |
|    MBS Numbering Pattern Flag | 1 bit | 0b0 - MBS Numbering Pattern not specified<br>0b1 - MBS Numbering Pattern specified |
|    Number of Symbols | 5 bits | |
|    If (MBS Numbering Pattern Flag == 1) { | | |
|      MBS Numbering Pattern IE( ) | Variable | |
|      { | | |
|      Reserved | 4 bits | |
|      Number of Substreams | 4 bits | |
|      For (i=1; i<=N; i++) { | | N = Number of Substreams |
|        i$^{th}$ Substream Descriptor IE ( ) | Variable | |
|      } | | |
|      CRC-16 | 16 bits | |
| } | | |

Table 3 describes the parameters in the Embedded MBS MAP IE. The Length parameter identifies the total length of the Embedded MBS MAP IE in bytes including the length field, the Reserved bits and CRC field. If the MBS Numbering Pattern Flag is set, the MBS Numbering Pattern IE is specified in this Embedded MBS MAP. If this flag is not set, the MBS Numbering pattern IE for the TDI described by this message is the same as the MBS Numbering Pattern IE for the next TDI (the TDI with an offset of one TDI).

The Number of Symbols field specifies the number of symbols the LDC MBS MAP for this MBS Zone ID occupies in the next TDI. If this value is set to zero, the number of symbols occupied by the LDC MBS MAP in the next TDI may be inferred from the LDC MBS MAP transmitted in the current TDI and not from the Embedded MBS MAP. The Number of Substreams specifies the number of Substream Descriptor IEs in the corresponding TDI for the current stream.

The structure of the MBS Numbering Pattern IE is given in Table 8. If the MBS Numbering Pattern IE is transmitted in the Embedded MBS MAP in the current TDI, it may be the same as the MBS Numbering Pattern IE that is transmitted in the LDC MBS MAP describing the same MBS Zone in the next TDI.

The structure of the Substream Descriptor IE is given in Table 11. All Substream Descriptor IEs transmitted in the Embedded MBS MAP in the current TDI may be the same as their associated Substream Descriptor IEs for the same substream that will be transmitted the LDC MBS MAP describing the substream in the next TDI.

Figure 16:
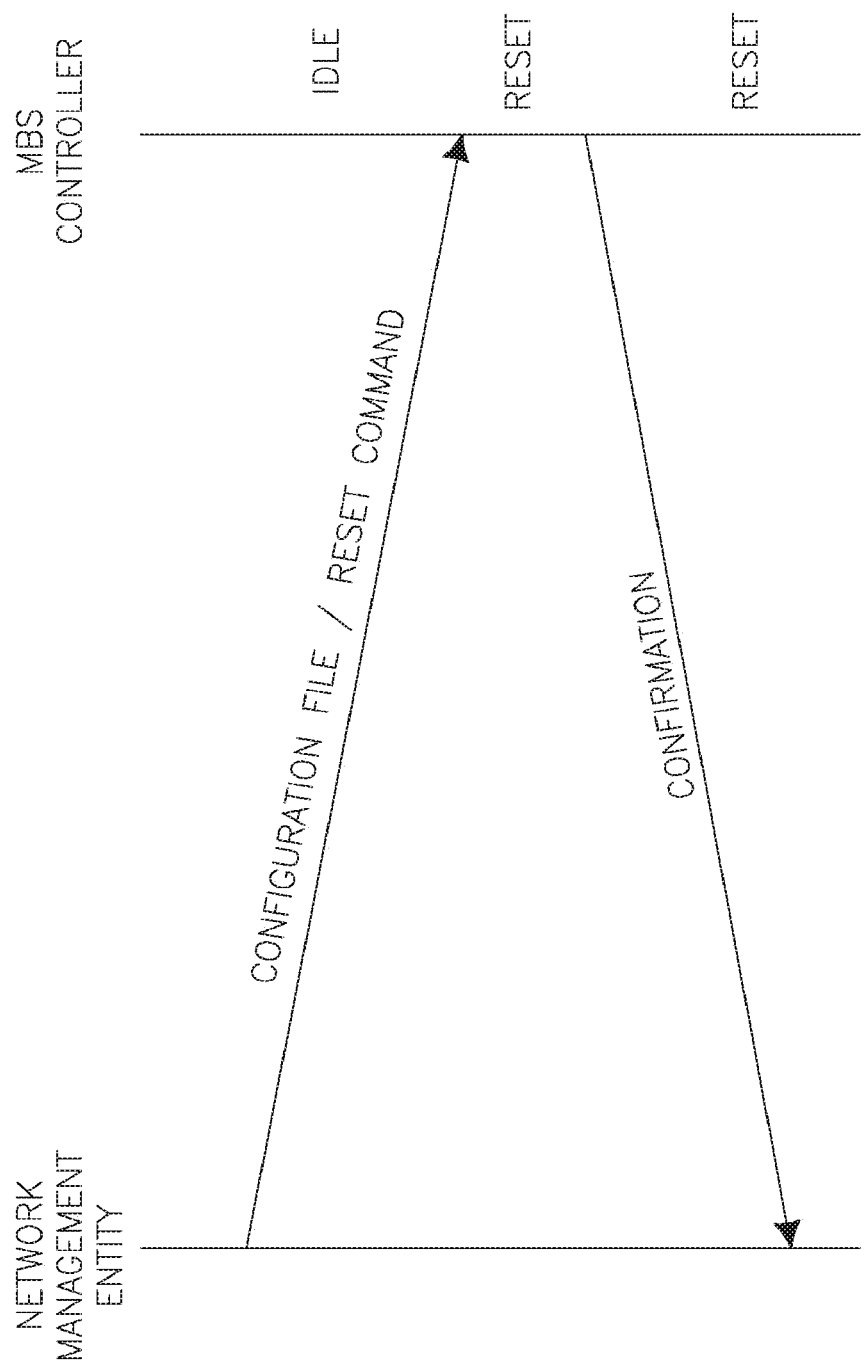
FIG. 16 shows an example transition from idle state to reset state.

Referring now to FIG. 16, discussed in more detail is the initialization and configuration of the MBSC. Upon power up, the MBSC enters the idle state and waits for a reset command. The reset command specifies a configuration file to become the effective configuration file, or a default configuration file may be used instead. After receiving the reset command with proper parameters, the MBSC enters the reset state and may send a confirmation message to the MBSC management entity.

The next step is acquiring the time base. Details of the timing synchronization mechanism are described below and briefly described here. The MBSC acquires the current time from the NTP server. The response of the NTP server is a 64-bit time-stamp consisting of a 32-bit second part and 32-bit fractional second part. The NTP start time may be, for example, Jan. 1, 1900 and wraps around every 136 years with the first wrap at the year 2036. If the NTP server and the MBSC are on the same local area network, the delay jitter of the timing information at the MBSC may be less than 200 microseconds; if the path connecting them includes several switching fabrics, the jitter may reach 200 microseconds. However, this delay jitter is irrelevant in normal operation of the MBSC as it relates to achieving macro-diversity over the air-interface. This is the case as long as the MBS frame is distributed to base stations well in advance of its due transmission time.

MBS frames are buffered at the base stations well before the actual transmission time. When the transmission time of a frame arrives, all synchronized base stations may generate and transmit the same signal.

However, this delay jitter may affect the internal timing of different processes in the MBSC. A software system may consider the fact that it cannot rely on the accuracy of the time provided by the NTP server for scheduling its internal processes. An internal MBSC clock may be periodically adjusted with the NTP time to make sure any clock drift is avoided. Processes at the MBSC may be performed based on the sequential MBS frames with a completion time target well before the transmission time.

Upon completion of this process, the MBSC transition to the normal operation state and starts receiving and buffering data from the CDS. The MBSC rounds up the NTP time to the next full second. MBS frame offset zero (0) may be assigned to the first frame starting right after the GPS 1 pps. The MRDP-MBSC may advertise this information, i.e., the UTC time-stamp and frame offset, to the ASN-GW or base stations in the network.

Figure 17:
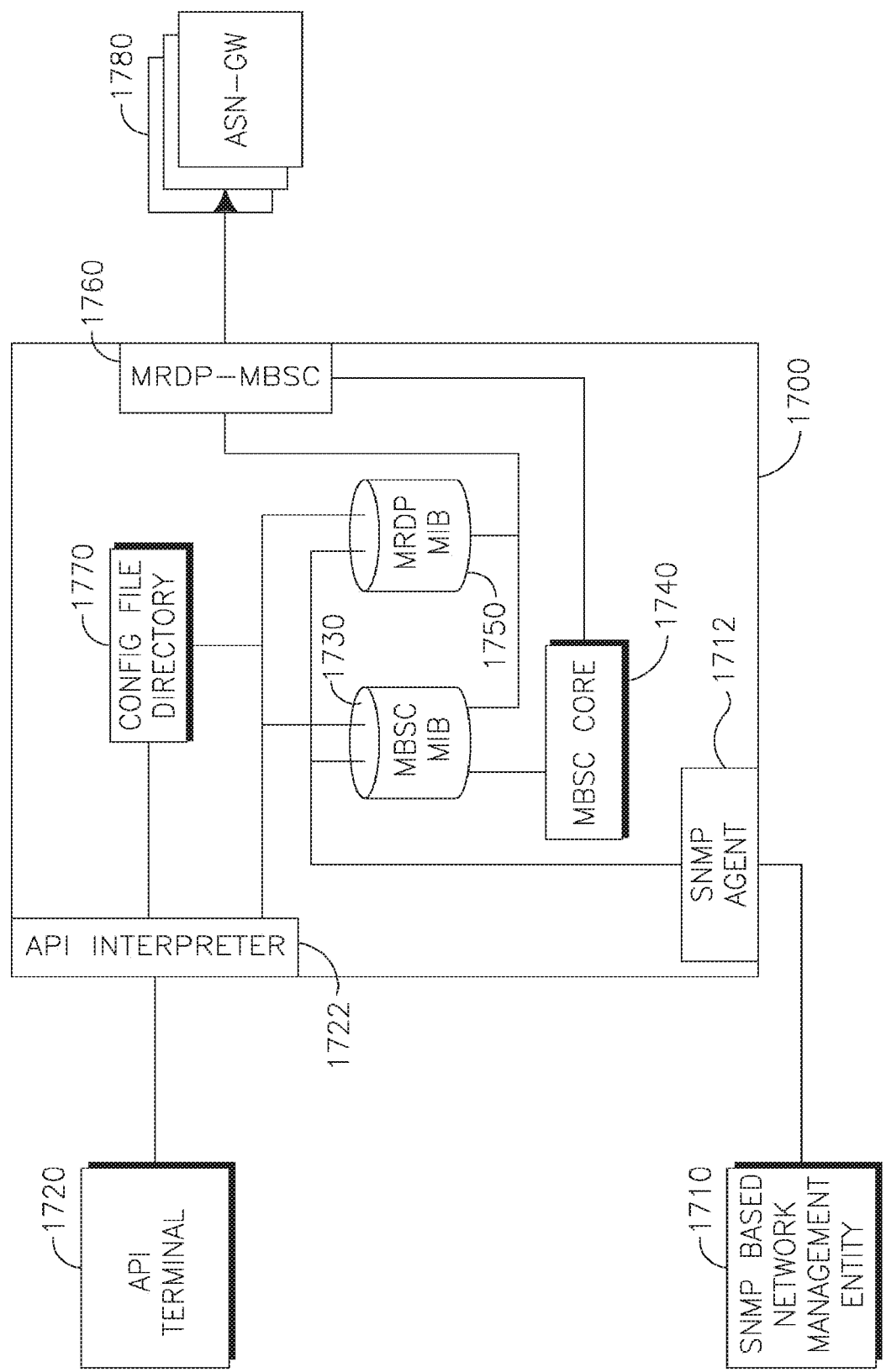
FIG. 17 shows an example management and control block diagram of the MBSC.
Figure 18A:
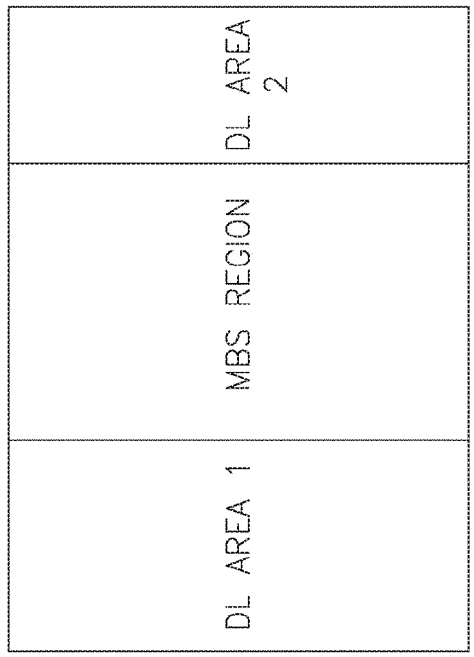
FIGS. 18(*a*) and (*b*) show examples of MBS region location scenarios.
Figure 18A:
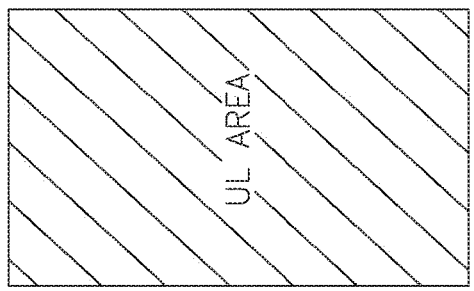
Figure 18B:
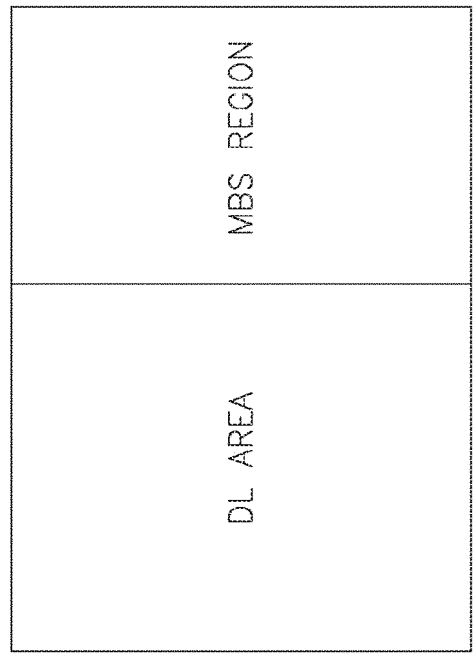
Figure 18B:
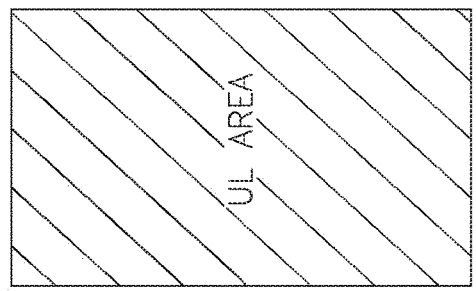

Referring now to FIG. 17, the configuration structure of the MBSC is now discussed. A MBSC 1700 may be managed and controlled using an SNMP based management entity 1710 via an SNMP agent 1712 or using an Application Programming Interface (API) terminal 1720 and interpreter 1722. The MBSC 1700 contains two Management Information Bases (MIBs) which are databases of configuration parameters and may include operation statistics of the device. MBSC MIB 1730 contains configuration parameters for operation of MBSC core 1740. The MRDP MIB 1750 contains configuration parameters required by the MRDP-MBSC 1760. The MRDP MIB 1750 is used by the MRDP-MBSC 1760, although MRDP-MBSC 1760 also uses the MBSC MIB 1730 for some configuration parameters that are also used by the MBSC core 1740. Both the SNMP manager 1710 and the API 1720 update information within MBSC MIB 1730 and MRDP MIB 1750.

The SNMP connection (collectively 1710 and 1712) enables the MBSC 1700 to be managed over the network. The SNMP manager 1710 may directly manipulate and query elements of MBSC MIB 1730 and MRDP MIB 1750. The API 1720 provides direct access to the MBSC 1700 via a terminal 1722 and provides a command line for sending commands to the device such as changing configuration parameters and receiving statistics reports. The API 1720 may also update a directory of configuration files 1770 which may be used for keeping the values of configuration parameters. Ideally, all functions may be performed through both the SNMP connection and the API 1720.

The API 1720 may be available through an interface where commands may be issued through a command line. The API enables receiving a new configuration file; resetting the MBSC with a new configuration file or with the default configuration file; setting a configuration file as the default configuration file; deleting an existing configuration file; getting the current value of an individual configuration parameter; setting the value of an individual configuration parameter; starting and stopping the MBSC; suspending and resuming the MBSC; and getting different statistics reports.

The API agent 1722 in the MBSC 1700 maintains a directory of configuration files and allows the API terminal 1722 to add, delete, and query the list of files in this directory. Moreover, the API allows for one of these files to be specified as the default configuration file. The API may support the set of commands in Table 4.

MBSC MIB 1730 and MRDP MIB 1750 are SNMP based MIBs which may be monitored and configured by the outside world using an SNMP connection. The SNMP interface 1712 on the MBSC 1700 manipulates these databases according to commands sent to the MBSC 1700 on the SNMP connection.

A configuration file 1770 specifies all the setting parameters of the MBSC 1700. The update of the configuration file might trigger a restart of the MBSC 1700. However, some individual configuration parameters may be modified in real time without the need to restart the MBSC 1700. These parameters may be updated using specific directives indicating the parameter that may be changed along with the new value of the parameter. An interface may be specified between the controlling entity (for example, Management PC) and the MBSC 1700 allowing for update of the configuration file and individual directives.

Configuration parameters may be divided into two main categories. MBSC MIB parameters that control the functional behavior of the MBSC 1700 and MRDP MIB parameters that may not affect the operation of the MBSC core 1740 but they may be used to manage the link between the MBSC 1700 and the ASN-GW 1780 or between the MBSC 1700 and the base stations (not shown).

Parameters in the MBSC MIB 1730 are used by the MBSC 1700 for the main task of MBS region scheduling for the MBS Zone corresponding to the MBSC 1700. The information in the MBSC MIB 1730 consists of three different types of parameters. A Zone Description parameter may include relatively static information, describing the fundamentals of the MBS Zone that the MBSC 1700 is associated with. These have a good overlap with the fields in the DCD in general and in the TDI Descriptor generated by the BS in particular. The Scheduling Databases include traffic classes, scheduling guidelines, look-up tables, schedule update schedules, and the like. The Stream Specific parameters are per-stream identifiers and guidelines for quality of service (QoS) and scheduling.

TABLE 4

API Command List and Parameters

| API Command | Command Parameters | Description |
|---|---|---|
| Reset | None | Resets the MBSC. Uses the default configuration file after reset. |
| Reset | <Configuration File> | Resets the MBSC after setting the configuration file. |
| Set_config_as_default | None | Sets the current configuration file as the default configuration file. |
| Set_config_as_default | <Configuration File> | Sets the configuration file as the default configuration file. |
| Delete_config_file | <Configuration File> | Deletes a configuration file from the file directory. |
| Receive_config_file | <Configuration File> | Adds a configuration file to the file directory. |
| Receive_lookup_table_file | <Lookup Table File> | Adds a lookup table file to the file directory. |
| Delete_lookup_table_file | <Lookup Table File> | Deletes a lookup table file from the file directory. |
| Change_config_param | <parameter ID><New Value> | Modifies the value of one specific configuration parameter. |
| Get_config_parameter | <parameter ID> | Gets the current value of a specific configuration parameter. |
| List_config_files | None | List all the configuration files in the file directory. |
| List_config_parameters | None | List all the configuration parameters. |
| Start | None | Start the MBSC from the idle mode. |
| Stop | None | Stop the MBSC. Go back to the idle mode. |
| Suspend | <Time duration> <Starting Time> | Suspend the MBSC for the given time duration starting at the Starting Time. |
| Resume | <Starting Time> | Resume operation of the MBSC from the suspend mode at the Starting Time. |
| Get_statistics_report | <report ID> | Generate a statistics report. |

The zone description parameters include MBS Zone ID, which is the underlying assumption that there is a one-to-one mapping between an MBSC and an MBS Zone. Each MBS Zone is therefore uniquely identifiable by its associated MBSC. Another parameter is the OFDMA Frame Duration which is the duration of the OFDMA TDD frame in microseconds. Another parameter is the Permutation Type in the MBS region, e.g. for example, PUSC or FUSC. The permutation type configured at the MBSC may be consistent with the permutation type used by the base stations in the MBS region. The number of modulation symbols per-slot may be derived from this parameter and may be used in scheduling. For all profiles defined in one embodiment of the MBSC, the Permutation Type may be PUSC.

The Carrier Bandwidth reflects the deployment in the geographical area corresponding to the MBS Zone. An LUT providing the number of subchannels, symbol group configuration and slot configuration for every allowed Carrier Bandwidth and Permutation Type may be included in the MIBs.

The TDI duration is in units of OFDMA frames. A TDI starts every TDI duration frames, and the time base is derived assuming a TDI started at UTC time zero. Therefore, having access to the UTC time, OFDMA Frame Duration and TDI duration jointly provide sufficient information to identify the frame where the upcoming TDI begins. For example, when the BS generates a DCD message, it needs this information to correctly populate the First Frame Offset field in the TDI Descriptor.

The Target Playback Delay specifies the target number of milliseconds for an application packet to be forwarded by the MBSC ahead of its intended consumption instance by the application at the client station as identified by the MBSG program schedule. The MBSC may attempt to meet this target at the end of each TDI scheduling. However, packets in excess of the minimum required to meet this target may be scheduled and forwarded ahead of time, up to a limit defined by the Max Playback Delay parameter. An attempt to change the configuration of this parameter when the MBSC is in the Normal Operation state may trigger a reset. This parameter may be updated during a voluntary reset cycle.

The Max Playback Delay is a threshold used by the MBSC to manage overflow. The MBSC may include more packets than required to meet the Target Playback Delay requirement for the purpose of efficient scheduling and reducing the possible waste of resources. However, since the buffering space at the BS may be limited and to avoid BS buffer overflow, the MBSC may limit its early packet forwarding, so that the playback delay is kept under Max Playback Delay milliseconds.

The MBS Region Max Width is the maximum width of the MBS region in OFDMA symbols. This parameter should be consistent with the MRDP MIB parameters MBS Region Minimum Starting Symbol and MBS Region Maximum Finishing Symbol. If these parameters are inconsistent, an error message may be sent to the management entity. In the profiles used for the MBSC, the MBS Pattern Vector may be computed offline and configured into the MBSC MIB. Under these conditions, the sole use for this parameter is to make sure that QoS violations do not occur in the two-way portion of the carrier. Therefore, if the MBS Region Max Width and the MBS Pattern Vector are inconsistent, an error message may be sent to the management entity. In an embodiment of the MBSC, the definition of the MBS Pattern Vector might be the responsibility of the MBSC, and this parameter, as well as others will be required when determining the MBS Pattern Vector.

The LDC MBS MAP Frame Offset is the OFDMA frame offset corresponding to the first instance of the LDC MBS MAP from the beginning of the TDI. If an LDC MBS MAP is transmitted in the first frame of the TDI, this field may be set to zero. Note that in one embodiment of MBSC the task of LDC MBS MAP scheduling is done offline and configured into the MBSC MIB. In another embodiment of the MBSC, the LDC MBS MAP scheduling task may be the responsibility of the MBSC, and it may therefore be the responsibility of the MBSC to self-configure this parameter.

The LDC MBS MAP Symbol Offset is a parameter that specifies the symbol offset of the location of the LDC MBS MAP within frames that contain the LDC MBS MAP. The LDC MBS MAP may always start at the first slot of the identified symbol (subchannel 0) and may occupy a number of OFDMA symbols completely and, in addition, a portion of the subsequent symbol group. If the LDC MBS MAP does occupy an integer number of symbol groups, the last symbol (in case of an FUSC MBS Zone) or the last symbol pair (in case of a PUSC MBS Zone) will be partially occupied by the LDC MBS MAP message. See FIGS. 14(*a*) and (*b*) for an example of an LDC MBS MAP occupying a non-integer number of symbols. The unit of assignment is a slot. A slot is defined by one symbol in one subchannel for FUSC and 2 symbols by one subchannel for PUSC. The note above with respect to different embodiments of the MBSC is applicable to this parameter.

The LDC MBS MAP Repetition Count parameter specifies the number of times the LDC MBS MAP repeats in the TDI. The LDC MBS MAP Repetition Period is a parameter that specifies the period of repetition. If the LDC MBS MAP Repetition Count is larger than one, this parameter specifies the period of repetition of the LDC MBS MAP is units of OFDMA frames. The LDC MBS MAP Maximum Number of Symbols parameter identifies the maximum possible size of the LDC MBS MAP. The actual number of symbols occupied by the LDC MBS MAP may be smaller or equal to the LDC MBS MAP Maximum Number of Symbols value. In the case of a PUSC permutation for the MBS Zone, this may be an even number. The MBS Pattern Vector is the pattern vector for the MBS Numbering System. The note above with respect to different embodiments of the MBSC is applicable to this parameter. The Frame Availability Cycle is the length of the pattern of OFDMA frames that is available for MBS content scheduling. This may be derived directly from the MBS Pattern Vector.

The Frame Availability Pattern is the pattern of frames within a TDI that is available for MBS traffic to be scheduled. For example, a '1' may signal 'available' and a '0' may signal 'not available'. For example, with a TDI duration equal to 200 OFDMA frames, and an Available Pattern equal to (0,0,1,1), scheduling for the MBS Zone is allowed in frames 2, 3, 6, 7, 10, 11 . . . of each TDI. The pattern (1), on the other hand, signals that all frames are available for scheduling traffic of the MBS Zone.

Scheduling database parameters are now disclosed. The TDI Transmission Bursts are the number of interleaved transmission data bursts for each substream in each TDI. This parameter may be applied to data transmission so that the data is delivered in bursts as uniformly as possible within the TDI.

The Traffic Class List, where for each Traffic Class the following parameters are defined. The Class Identifier is an index, by which incoming data streams and substreams will be mapped to classes. The Weight is the number of slots required to transmit 1000 bits in this class. This is derived from the MCS, repetition, inner-FEC rate, outer code rate configuration, and CRC configurations for the traffic class. This information may be used by the MBSC to verify that it has sufficient resources in the TDI to schedule all the incoming traffic. The Target FEC Block Size is the type of allocations used by the base stations for hybrid automatic repeat request (HARQ) with CRC encoding. The configuration file specifies a Target FEC Block Size for the Class. Under certain conditions, the scheduler may be allowed to deviate from this size. The Alternative FEC Block Sizes structure may be utilized if deviating from the Target FEC Block Size.

The Alternative FEC Block Sizes is a structure that lists optional Alternative FEC Block Sizes and, for each one, a corresponding Alternative Traffic Class that may be utilized if switching to the Alternative FEC Block Size. This may be used by advanced schedulers when the use of the Target FEC Block Size for scheduling in the TDI results in inefficient packing. The Inner-FEC CRC may be either none or CRC-16 is permitted. The Fundamental Allocation Unit is the minimum number of symbol groups such that an integer number of FEC blocks fit into an integer number of symbol groups. The Modulation parameter defines the type of modulation, such as, for example, QPSK, 16-QAM and 64-QAM. The Inner Code Rate parameter is the inner-code rate supported as a function of the modulation. For allowed combinations see Table 5. The Repetition Selection is in addition to the repetition 1 option (no repetition), for QPSK modulation. Repetition of 2, 4 and 6 are supported as shown in Table 5.

The Bits per Slot are the number of bits per slot is a two byte integer number ranging from 8 (representing QPSK rate 1/2 rep 6) to 288 (64-QAM rate 3/4). Non-integer bits per slot are technically feasible for 16-QAM and 64-QAM. However, coding rates that result in a non-integer number of bits per slot are unconventional and coding rates with an integer number of bits per slot are available that have a similar number of bits per slot. Modulation, inner-coding and repetition combinations may be selected from Table 5. Note that the modulation, code-rate and repetition combination are identified in the traffic class by the corresponding single parameter, the DIUC, according to Table 5.

The Outer-Coding Mode may be used for the traffic class. Mode 0 represents "no outer-coding". Mode 1 is the Basic Reed-Solomon Outer-Coding. The RS Parity Symbols are the number of Reed-Solomon parity symbols that may be included in each outer-code word in Basic Reed-Solomon Coding mode 1. The Target RS Data Symbols are the target number of data symbols in Basic Reed-Solomon Coding mode 1. The actual number may be smaller, depending on the scheduler. The Minimal Row Increment is the number of rows in an RS block that may be configured to be an integer multiple of the Minimal Row Increment. Any integer number of rows may be allowed.

The Packet Fragmentation is a flag that signals whether application packet fragmentation is allowed for the substream assigned to this traffic class. The Application Packet CRC is one of the three options none, CRC-16 or CRC-32. The Max Allocation patterns are the number of allocation patterns that are allowed to be used for each substream with this traffic class. The Scrambling Type are the three allowed modes for scrambling including none, fixed number of bytes or multiple of the number of outer-code block rows.

The Scrambling Increment is a flag where if the Scrambling Type indicates that no scrambling may take place for the substream, this parameter may be ignored. If the Scrambling Type indicates that a fixed number of bytes may be scrambled, the MBSC reads a number of bytes equal to Scrambling Increment at a time scrambles those bytes with increasing indentation and then packs them into MAC PDUs and PHY PDUs. If the Scrambling Type indicates that a multiple of the number of outer-code block rows may be used for scrambling, the number of bytes to be scrambled at a time is given by the number outer-code block row multiplied by the Scrambling Increment.

TABLE 5

List of Allowed Modulation and Coding Combinations

| DIUC | Constellation | Repetition | Code Rate | Data Rate (bits/slot) |
|---|---|---|---|---|
| 0 | QPSK | 6 | 1/2 | 8 |
| 1 | QPSK | 4 | 1/2 | 12 |
| 2 | QPSK | 2 | 1/3 | 16 |
| 3 | QPSK | 2 | 1/2 | 24 |
| 4 | QPSK | 1 | 1/3 | 32 |
| 5 | QPSK | 1 | 1/2 | 48 |
| 6 | QPSK | 1 | 2/3 | 64 |
| 7 | QPSK | 1 | 3/4 | 72 |
| 8 | 16-QAM | 1 | 1/2 | 96 |
| 9 | 16-QAM | 1 | 3/4 | 144 |
| 10 | 64-QAM | 1 | 1/2 | 192 |
| 11 | 64-QAM | 1 | 3/4 | 288 |
| 12-15 | Reserved | — | — | — |

Disclosed now are stream specific parameters. The Update Schedule is a structure that specifies a schedule for parameter changes and the new values at each time. This structure may support regular daily and weekly parameter changes, one-time rules and changes to the schedule without reprogramming the entire schedule. Effective times may be precise with second level accuracy. The Update Schedule may include an Allocation Upper Limit associated with each change in the application traffic stream set that makes-up the multiplex, the units of which are in OFDMA symbols per-second or the like.

The Number of Streams is the number of application traffic streams included in the multiplex for the MBS Zone corresponding to the MBSC. For each Stream, a Stream Descriptor with the following components may be specified. The Stream ID may be a 12 bit stream identifier. The Destination IP address is the destination IP address identifying application packets associated with the stream. This may be used for stream de-multiplexing in the MBSC. The Number of Substreams is the number of substreams the stream is composed of.

For each substream, a Substream Descriptor with the following components may be specified. The Substream ID may be a 4 bit Substream identifier. The Identifier method is the method for de-multiplexing packets of an incoming stream into the queues associated with the constituent substream. Some of the options are user datagram protocol (UDP) port, real-time protocol (RTP) fields, 11.264 network abstraction layer (NAL) configuration, etc. An Identifier index identifies the index corresponding to the substream and according to the Identifier Method. The Traffic Class Index is an index of the Traffic Class that the data corresponding to the substream may be associated with. Traffic Class specifies PHY and outer-coding parameters such as modulation code scheme (MCS), repetition, Outer-Coding mode, Outer-Coding configuration, target FEC block sizes, and the like. The Substream Priority is used for the case when the overall allocation for the multiplex needs to be exceeded in a given TDI, the decision of packet drops may be made on a Substream basis using this priority indication.

The Maximum Allowable Allocation is the maximum allowable physical allocation to the stream in units such as OFDMA symbols or slots per second. This amount may not be exceeded for the given Stream in any TDI. The Scrambling Type are the three allowed modes for scrambling including none, fixed number of bytes or multiple of the number of outer-code block rows. Other scrambling types are possible. The Scrambling Increment is used if the Scrambling Type indicates that no scrambling may take place for the substream. The MBSC reads a number of bytes equal to Scrambling Increment at a time scrambles them with increasing indentation and then packs into MAC PDUs and PHY PDUs.

Disclosed now are the configuration Parameters in the MRDP MIB. The following is an example list of configuration parameters that may be included in the MRDP MIB. The Delay After Reset parameter is a systematic time delay after the reset before base stations try to re-establish their connection with the MBSC. The value of this parameter may be sent to base stations along with the reset command. Each base station may locally close its session with the MBSC, wait for the specified time delay and a random delay on top of it before trying to re-establish its connection with the MBSC. This only applies to MRDP Type 2A.

The ASN-GW Connection field specifies if a connection to the ASN-GW is available and provides access information to the ASN-GW if a connection to the ASN-GW is available. This only applies to MRDP Type 2C. The MBS Region Minimum Starting Symbol parameter specifies the largest symbol index in the DL frame which may not be occupied by the MBS region. The MBS region may start at a symbol offset larger than this parameter. This parameter may be configured to a large enough value, such that overlaps of the DL-MAP and the MBS region in OFDMA frames are avoided.

The MBS Region Maximum Finishing Symbol parameter specifies the largest symbol index in the DL frame where the MBS frame could possibly occupy. This may be set to the index of the last symbol of the DL frame, if desired, to have the MBS region at the end of the DL frame.

For example, the MBSC not only specifies the size of the MBS region, it also specifies the location of the MBS region within a DL frame. The best location for the MBS region is the end part of a DL frame. However, the configuration file may force the MBS region to start after a certain point by setting the minimum starting point parameter and finishing before a certain point in a DL frame by setting the maximum finishing point parameter. In order to position the MBS region at the end of the DL frame, the maximum finishing point may be set at the final symbol of the downlink frame. The minimum starting point may be set M symbols earlier where M is the maximum allowed width of the MBS region in symbols.

Referring now to FIG. 18, the last part of a DL frame may be an appropriate position for the MBS region when the MBS region is in the middle of the frame, and in order to use the area after the MBS region, a new zone needs to be established. This may cause additional overhead. The last part may also be appropriate when the MBS region is in the middle of the frame, and the remaining area may be fragmented into two pieces. Any allocation packing in this area may be less efficient than a packing resulting from a contiguous area containing the two regions.

The Downstream Target Delay parameter specifies the target time interval before over-the-air transmission of information when the MBSC may have finished building the MBS region. Upon completion of the MBSC's operation and building the MBS region, the MBSC may stamp the frame for transmission at a given time which is far enough in the future so that it may be distributed to all base stations. This parameter may be set such that all base stations in the network may receive the MBS region content on-time before the actual transmission of the frame over-the-air. For example, this target delay may be chosen large enough to guarantee successful completion of the MRDP protocol. Base stations may have a large enough buffer to receive and store the amount of data generated by the MBSC during this time interval. The farther away the base station is from the MBSC, the longer it takes for the frames to reach the base station. As a result, their wait time in the base station buffer may be shorter. Therefore the buffer level in the base station buffer may be smaller.

Disclosed now are example methods for time management including external time management and internal time management. The MBSC needs to ensure that the transmitted signals from different base stations are synchronous in the MBS region. The assumption is that all base stations are equipped with a GPS providing them with the UTC time and 1 pps signal at the turn of each second. The UTC timestamp is a 64-bit number consisting of 32 bits specifying the second since Jan. 1, 1900, and the other 32 bits specify the fraction of the second.

Note that the original time broadcast by the GPS is different from the UTC based time. The difference between the two time bases is captured as leap seconds which are also advertised as part of the GPS national marine electronic association (NMEA) message. Therefore, each GPS may generate the current UTC time. Moreover, note that the 1 pps pulses generated by all GPS receivers are synchronized to a high precision.

The MBSC labels each frame with a time stamp. The time stamp consists of a 32-bit field specifying the UTC time of transmission of the frame in seconds and two bytes specifying the frame offset from the frame at the turn of the second. Frame offset zero refers to the first frame starting after the 1 pps pulse, and the MRDP counterpart on the base station side may be able to uniquely identify the frame based on the UTC time stamp and frame offset.

It is also important to maintain accuracy of the internal timing mechanism. Although packet buffering at the base station provides some protection against a drift of the MBSC's internal clock with respect to GPS time, if left uncorrected for long periods, the timing drift may grow and eventually result in a buffer spillage or drainage at the base stations. To avoid this problem, there is a need to make sure that the timing at the MBSC remains in good synchronization with the UTC clock. To achieve this, the MBS may use a NTP daemon conforming to, for example, RFC-1305, RFC-1059 and RFC-1119 for adjustment and controlling of the internal clock. The standard Linux "ntpd program" provides the required level of timing precision on Linux systems with a clock accuracy better than 500 ppm.

The "ntpd program" operates by exchanging messages with pre-configured NTP servers at designated poll intervals. These poll intervals may be used for estimating and adjusting the frequency of the local oscillator at the Linux box. In case of a time drift, the "ntpd program" smoothly corrects the timing error with small steps so that the timescale remains continuous and never runs backwards.

The "ntpd program" continuously monitors and corrects for the clock frequency drift and writes the latest value to the ntpd.drift file. When ntpd is started and this file does not exist, it takes about 15 minutes to measure this frequency offset. The "ntpd program" is capable of measuring and adjusting frequency offset errors of up to 500 ppm with 64-second polling intervals. The limit of offset capturing capability decreases by a factor of two for each doubling of the polling interval. Ordinarily, the polling interval starts at 64 seconds and eventually as the estimate of the frequency offset becomes more and more accurate, the polling interval increases in steps to 1024 seconds. The minimum and maximum values of the polling interval by default are set to 64 and 1024 respectively but may be modified by overwriting the "minpoll" and "maxpoll" parameters.

More particulars for the LDS MBS MAP Composition are now presented. The LDC MBS MAP may be transmitted in the MBS region. The location of all instances of the LDC MBS MAP for each MBS Zone may be signaled by the TDI Descriptor in the DCD message. The modulation and coding used for transmission of the LDC MBS MAP may be specified by the LDC MBS MAP DIUC parameter in the relevant TDI Descriptor in the DCD message.

A client station entering the network (initial service acquisition) may decode the DCD message first. The client station may find a list of TDI Descriptors associated with different MBS Zone IDs in the DCD message. The client station may continue decoding DCD messages until it decodes a DCD message with the TDI Descriptor for the MBS Zone the client station is interested in joining. The client station may decode the TDI Descriptors associated with the MBS Zone ID of interest and finds the location of all instances of the LDC MBS MAP for the given MBS Zone.

Knowing the location of the LDC MBS MAP, the client station has access to all information required for decoding the LDC MBS MAP. The allocation that carries the LDC MBS MAP occupies all the sub-channels of an integer number of symbols and a number of slots in a last symbol group. The modulation and coding used to encode the LDC MBS MAP is identified in the TDI Descriptor in the DCD message.

The LDS MBS MAP Protocol is now presented. The LDC MBS MAP contains information describing the structure and location of streams in the MBS Zone in the next TDI. The LDC MBS MAP contains some general information about the structure of the next TDI that all receivers interested in the content of any stream of the MBS Zone may require for successful reception. It also contains descriptors of the structure of individual streams of the MBS Zone in the next TDI.

An LDC MBS MAP describes the structure of the MBS region for a specific MBS Zone. The LDC MBS MAP carries information about all streams transmitted in the TDI. Moreover, it carries a description of all allocations that carry data for each stream and also includes the specification of the Packet Delineation Information format used for each of the substreams. The LDC MBS MAP message is shown in Table 6.

TABLE 6

| \multicolumn{3}{c}{LDC MBS MAP Message} | | |
| --- | --- | --- |
| Field | Size | Notes |
| LDC MBS MAP( ) { <br>   MBS Zone Descriptor IE( ) <br>   For (i=1; i<=N; i++) | Variable | N = Number of Stream Descriptors (in the MBS Zone Descriptor IE) |

TABLE 6-continued

| \multicolumn{3}{c}{LDC MBS MAP Message} | | |
| --- | --- | --- |
| Field | Size | Notes |
|   { <br>     $i^{th}$ MBS Stream Descriptor IE <br>   ( ) <br>   } | Variable | |

The LDC MBS MAP for each MBS Zone contains a MBS Zone Descriptor IE and a number of MBS Stream Descriptor IEs. The structure of the MBS Zone Descriptor IE is described in Table 7. The MBS Zone Descriptor IE is appended by a CRC-16. Checking the CRC on this IE is mandatory if the client is decoding the LDC MBS MAP. If this CRC-16 check fails, the rest of the received LDC MBS MAP may not be used and may be discarded. The receiver may attempt to receive the next LDC MBS MAP in the same TDI if the LDC MBS MAP is transmitted more than once in the TDI.

The LDC MBS MAP contains a series of MBS Stream Descriptor IEs. The number of these descriptors is specified in the MBS Zone Descriptor IE. The MBS Zone Descriptor also specifies all the Stream IDs transmitted in this MBS Zone and also the length of each MBS Stream Descriptor IE that describes the composition of the stream in the TDI. This information may be used to find the location of the beginning of each MBS Stream Descriptor IE in the LDC MBS MAP. Each MBS Stream Descriptor IE is appended by a CRC-16 and the IE may be discarded if the CRC-16 check fails.

The MBS Zone Descriptor IE contains information about the composition of the particular MBS Zone. This message is appended by a CRC-16 field and checking this CRC is mandatory for any receiver that is decoding the LDC MBS MAP. If this CRC check fails, the rest of the received LDC MBS MAP may be discarded.

TABLE 7

| \multicolumn{3}{c}{MBS Zone Descriptor IE} | | |
| --- | --- | --- |
| Field | Size | Notes |
| MBS Zone Descriptor IE( ) { <br>   MBS Zone ID <br>   Number of Symbols <br>   MBS Numbering Pattern <br> IE( ) <br>   Stream Descriptor Location <br> IE( ) <br>   CRC-16 <br> } | 11 bits <br> 5 bits <br> Variable <br><br> Variable <br><br> 16 bits | |

In Table 7, the MBS Zone ID identifies the MBS Zone described by the TDI Descriptor. This field may be the same as the MBS Zone ID in the TDI Descriptor message for the current MBS Zone. The Number of Symbols field specifies the number of symbols that the LDC MBS MAP occupies in the next TDI. If this value is set to zero, the number of symbols occupied by the LDC MBS MAP in the next TDI may not be inferred from the current LDC MBS MAP. The receiver may use the Max Width value from the TDI Descriptor in the DCD instead.

The MBS Numbering System (MNS) is a method of assigning a consecutive set of numbers to detached groups of OFDMA symbols in different OFDMA frames in a TDI.

The MBS Numbering System is established through a vector identified as a MBS Pattern Vector.

The MBS Pattern Vector, specified using the MBS Numbering Pattern IE, specifies a group of OFDMA symbols across multiple OFDMA frames that compose each TDI. The MBS Numbering Pattern IE is a component of the MBS Zone Descriptor message. The MBS Pattern Vector is specified by the MBS Pattern Vector Length which specifies the number of elements of the MBS Pattern Vector and individual MBS Pattern Vector Elements.

TABLE 8

MBS Numbering Pattern

| Field | Size | Notes |
|---|---|---|
| MBS Numbering Pattern { | | |
|     MBS Pattern Vector Length | 8 bits | |
|     For (i=1; i<=N; i++) { | | N = MBS Pattern Vector Length |
|         $i^{th}$ MBS Pattern Vector Element | 8 bits | |
|     } | | |
| } | | |

In Table 8, the MBS Pattern Vector Length parameter specifies the number of elements of the MBS Pattern Vector. The MBS Pattern Vector Element is a set of parameters that specifies the elements of the MBS Pattern Vector. In the case of use of a PUSC permutation in the MBS region, each MBS Pattern Vector Element may be an even number.

Assume the MBS Pattern Vector is denoted by $\vec{l}=(l_1, l_2, \ldots, l_K)$ The $i^{th}$ element of the MBS Pattern Vector, i.e., $l_i$ identifies the last $l_i$ symbols of the downlink subframe of the OFDMA frames in frames i, K+i, 2K+i, ... of each TDI. These symbols specify a numbering system that may be used in identifying the boundary of Segments in the MBS region (segments are defined below). This numbering system is referred to as the MNS herein. The locations of all Segments in the Stream Descriptors are identified in the MNS.

Index of the first symbol assigned in the MNS is zero. The last $l_i$ symbols of the first frame are indexed by 0 ... ($l_1$−1). The second OFDMA frame contains indices 1 ... ($l_1+l_1$−1). Similarly, the $K_{th}$ OFDMA frame of the TDI contains indices ($l_1+ \ldots +l_{K-1}$) ... ($l_1+ \ldots +l_K$−1). The K+1$^{th}$ OFDMA frame of the TDI contains indices ($l_1+ \ldots +l_K$) ... ($l_1+ \ldots +l_K+l_1$−1). The following example method may be used to identify the location of a particular symbol D specified in the MNS.

Derive a new vector $\vec{L}=(L_1, L_2, \ldots, L_K)$, where the $i^{th}$ element of the vector is given by $$L_i = \sum_{j=1}^{i} l_j.$$

For notational convenience, assign $L_0=0$.
Find $$p = \left\lfloor \frac{D}{L_K} \right\rfloor.$$

Find the smallest m, $1 \leq m \leq K$ such that $D < pL_K + L_m$.
Symbol D in the MNS is located in the (pK+m)$^{th}$ OFDMA frame of the TDI. The number of OFDMA symbols assigned to the MNS in this frame is $l_m$. These are the last $l_m$ symbols of the (pK+m)$^{th}$ OFDMA frame of the TDI.

Symbol D in the MNS is the (D−pL$_K$−L$_{m-1}$+1) th symbol from the set of $l_m$ symbols in the OFDMA frame specified by the MNS.

Note that not all OFDMA symbols specified by the MNS are occupied by the MBS content data. The MNS just assigns a sequence of consecutive numbers to a group of symbols in different OFDMA frames of a TDI that may potentially be occupied by an MBS allocation. For an example of the assignment of symbols to the MNS see below.

Disclosed now is a stream description locator. The Stream Descriptor Location IE specifies the size of each Stream Descriptor in the LDC MBS MAP. This information may be used by the receiver to locate a particular Stream Descriptor in the LDC MBS MAP.

TABLE 9

Stream Descriptor Location IE

| Field | Size | Notes |
|---|---|---|
| Stream Descriptor Location IE( ) { | | |
|     Number of Stream Descriptors | 8 bits | |
|     For (i=1; i<=N; i++) { | | N = Number of Stream Descriptors |
|         $i^{th}$ Stream ID | 12 bits | |
|         Length of $i^{th}$ Stream Descriptor | 12 bits | |
|     } | | |
| } | | |

In Table 9, the parameters include the Number of Stream Descriptors, which specifies the number of Stream Descriptors carried in the LDC MBS MAP. It also includes Stream ID, which is a set of parameters that specifies individual Stream IDs where a corresponding Stream Descriptor IE is sent in the current LDC MBS MAP. Stream Descriptor IEs may appear in the same order in the LDC MBS MAP as their corresponding Stream IDs are specified in the current message. The Stream ID may be a unique number between all the MBS Zones that share a transmitting base station, i.e., the same Stream ID should not appear in two different MBS Zones transmitted by the same base station. The Stream ID should also be unique among all overlapping and neighboring MBS Zones.

The Length of $i^{th}$ Stream Descriptor parameter specifies the length of the associated Stream Descriptor IE in bytes. This information should be used in parsing the LDC MBS MAP to identify the correct location of Stream Descriptors of interest.

The MBS Stream Descriptor IE associated with each Stream ID describes the composition of the particular Stream in the next TDI. Each MBS Stream Descriptor contains one or more (up to 15) Substream Descriptors. The content of each MBS Stream Descriptor may be appended by CRC-16. The MBS Stream Descriptor IE may be discarded if the CRC-16 check fails

TABLE 10

MBS Stream Descriptor IE

| Field | Size | Notes |
|---|---|---|
| MBS Stream Descriptor IE( ) { | | |
|     Number of Substreams | 4 bits | |
|     Reserved | 4 bits | |
|     For (i=1; i<=N; i++) { | | N = Number of Substreams |

TABLE 10-continued

MBS Stream Descriptor IE

| Field | Size | Notes |
|---|---|---|
|     $i^{th}$ Substream Descriptor IE | Variable | |
| ( ) | | |
|     } | | |
|     CRC-16 | 16 bits | |
| } | | |

In Table 10, the Number of Substreams parameter specifies the number of Substream Descriptor IEs in the current MBS Descriptor IE. Each Substream Descriptor identifies a data partition that may have specific characteristics and transmission requirements. Each substream may be transmitted with a different modulation, different coding rate, different time slicing characteristics, different outer coding rate, etc. Each stream may be composed of multiple substreams.

As shown in Table 11, each Substream Descriptor contains a Timing Descriptor IE, a PHY Descriptor IE and an Outer Coding IE. The Timing Descriptor IE specifies the timing of transmission of component bursts of a substream in the TDI. The PHY Descriptor IE specifies characteristics of the Physical Layer bearer packets. The Outer Coding IE describes the outer coding information.

TABLE 11

Substream Descriptor IE

| Field | Size | Notes |
|---|---|---|
| Substream Descriptor IE( ) { | | |
|     Timing Descriptor IE( ) | Variable | |
|     PHY Descriptor IE( ) | Variable | |
|     Outer Coding IE( ) | Variable | |
| } | | |

The Timing Descriptor IE identifies the time of transmission of different pieces of each substream. A substream may be composed of several segments. Each segment is a set of consecutive symbols in the MNS. Note that symbols composing a segment do not necessarily occupy contiguous OFDMA symbols. A segment may occupy multiple OFDMA frames.

A segment in the MNS will be specified with a starting symbol location D and the width of the Segment W. The width of the Segment W may always be an even number for MBS Zones with a PUSC permutation. The Segment may span more than one OFDMA frame. Each Segment therefore may consist of one or more OFDMA allocations.

TABLE 12

Timing Descriptor IE

| Field | Size | Notes |
|---|---|---|
| Timing Descriptor IE( ) { | | |
|     Number of Segment Patterns | 4 bits | |
|     Reserved | 4 bits | |
|     For (i=1; i<=N; i++) { | | N = Number of Segment Patterns |
|         Segment Starting Offset | 16 bits | |
|         Segment Width | 8 bits | |
|         Segment First Slot Offset | 8 bits | |
|         Segment Count | 5 bits | |
|         Segment Period | 11 bits | |
|         Segment Last Slot Offset | 8 bits | |
|     } | | |
| } | | |

In Table 12, the Number of Segment Patterns parameter specifies the number of Segment Patterns described in the current Timing Descriptor IE for the current substream. A Segment Pattern is a periodic pattern of Segments with the same Segment Width that may be repeated a number of times with a fixed period in the MNS domain. The Segment Starting Offset parameter specifies the location of the start of the first instance of the described Segment in the MNS. If a particular Segment repeats more than once, the starting location of the next instances of the Segment may be specified using the Segment Period parameter and the next instances of the Segment will occur after the given Segment Period symbols in the MNS. The Segment Starting Offset parameter may be an even number for MBS Regions with a PUSC permutation.

The Segment First Slot Offset parameter specifies the subchannel that the first slot of the Segment occupies. If this parameter is set to 0x00, it may be interpreted as follows: there is no slot offset and the first symbol (in case of an FUSC permutation) or the first symbol pair (in case of a PUSC permutation) is fully occupied by the Segment. The Segment Width parameter specifies the number of symbols occupied by each instance of the described Segment. Segment Width may always be an even number for MBS Zones with a PUSC permutation. The Segment Count parameter specifies the number of recurrences of the described Segment in the TDI. A value of 0b00000 may be interpreted as 32. Zero is not a valid number of recurrences.

The Segment Period parameter specifies the period of repetition of the described Segment in the MNS. The Segment Period parameter may be an even number for MBS Zones with a PUSC permutation. The Segment Last Slot Offset parameter specifies the subchannel that the last slot of the Segment occupies. If this parameter is set to 0x00, it may be interpreted as there is no slot offset and the last symbol (in the case of an FUSC permutation) or the last symbol pair (in the case of a PUSC permutation) is fully occupied in the Segment.

A Segment is defined by the Segment Starting Offset, Segment First Slot Offset, Segment Width and the Segment Last Slot Offset. A Segment may be repeated (the allocation, not the data) for a given number of times in regular symbol intervals in the MNS.

Each instance of a Segment may be composed of one or more allocations in one or more OFDMA frames. Each allocation composing a Segment in a different OFDMA frame may use an even number of OFDMA symbols for MBS Zones with PUSC permutation. If a single allocation in one OFDMA frame is not large enough to include the entire Segment, the Segment will be broken into more than one allocation. In this case, each allocation may have an even number of OFDMA symbols for MBS Zones with a PUSC permutation.

All allocations composing a Segment may be located in consecutive OFDMA frames that have non-zero assignment in the MNS. If a Segment includes more than one allocation spanning different OFDMA frames, the first allocation may start at the specified location and the allocation may continue to the last OFDMA symbol of the downlink frame. The next allocation starts at the next OFDMA frame with non-zero assignment in the MNS. If the maximum allowed size of the MBS region according to the MBS Pattern Vector in this OFDMA frame is not large enough to contain the remaining portion of the Segment, new allocations in a third OFDMA frame with non-zero MNS assignments may be assigned. This process continues until the entire width of the Segment is assigned.

The Segment First Slot Offset and the Segment Last slot offset specify the subchannel offset of the first and last slot of the allocation in their corresponding OFDMA frames. If a Segment is divided into more than two allocations, only the first allocation and the last allocation may contain partially filled symbols. All other allocations may fully occupy an integer number of OFDMA symbols.

Figure 19A:
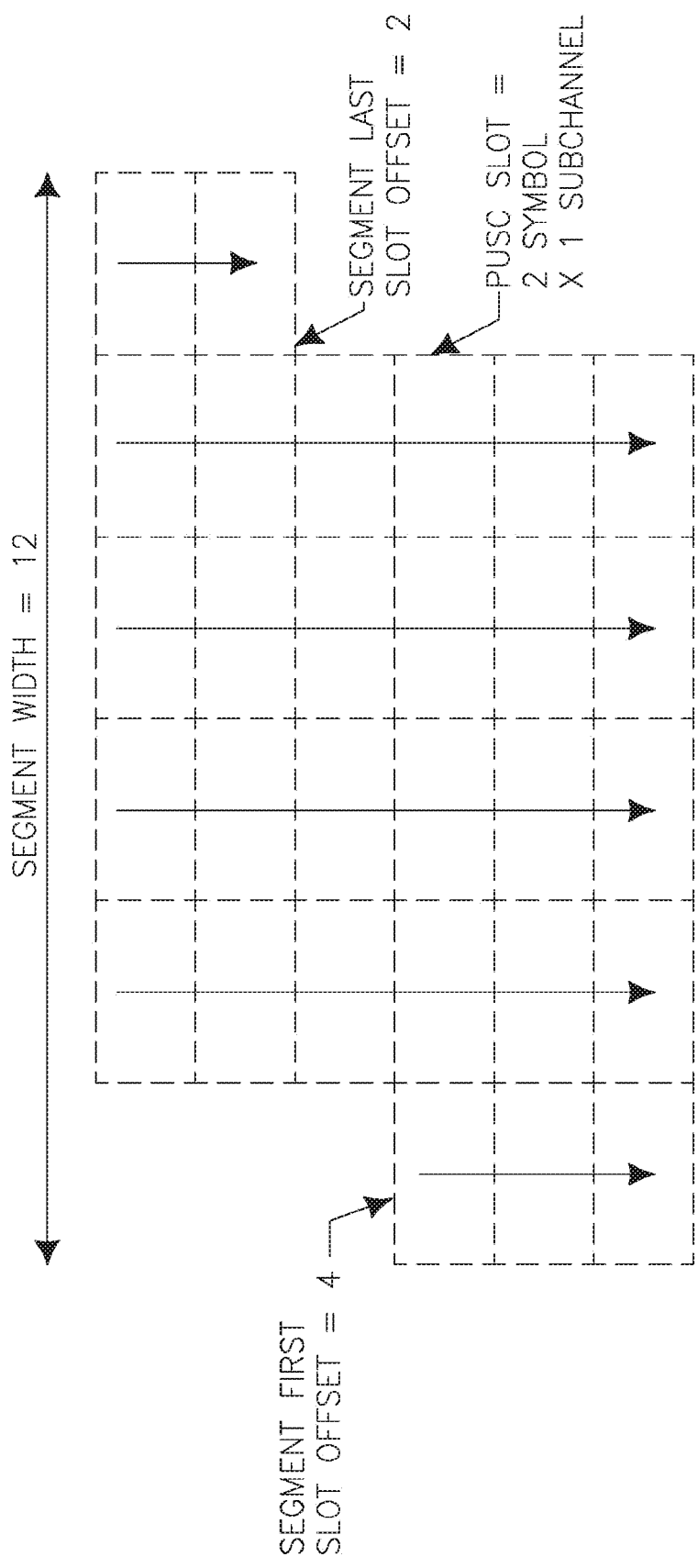
FIGS. 19(*a*), (*b*) and (*c*) show examples of a segment divided into multiple allocations.
Figure 19B:
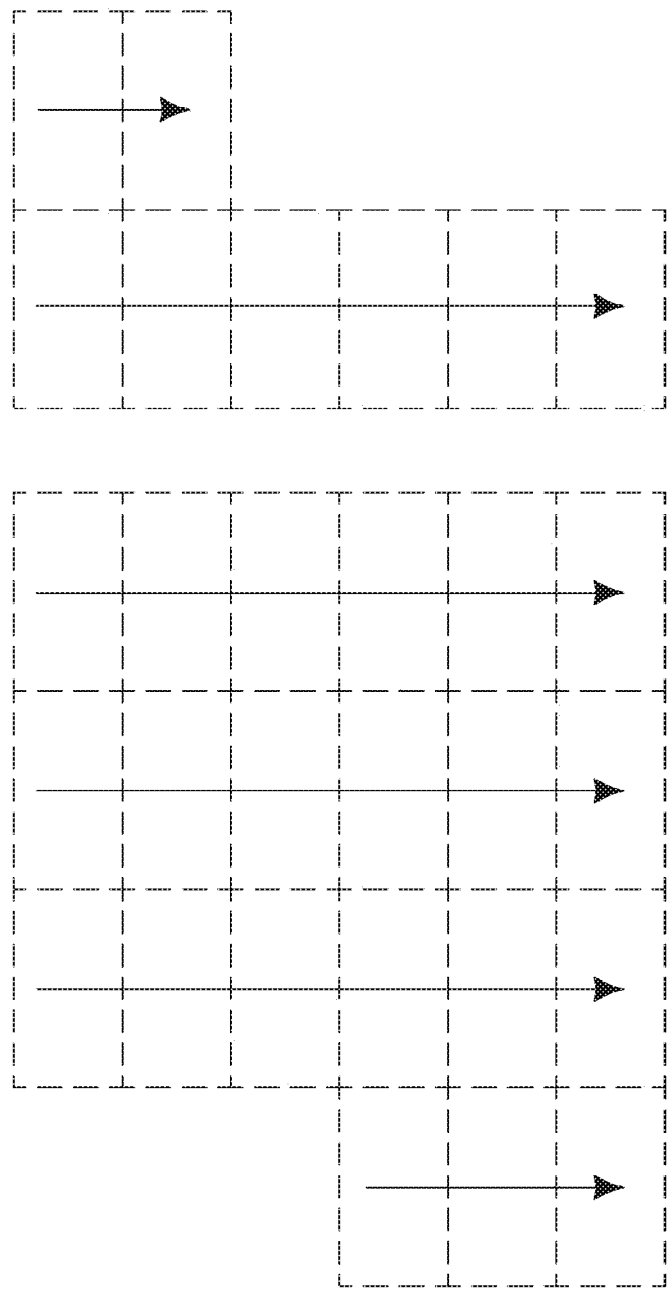
Figure 19C:
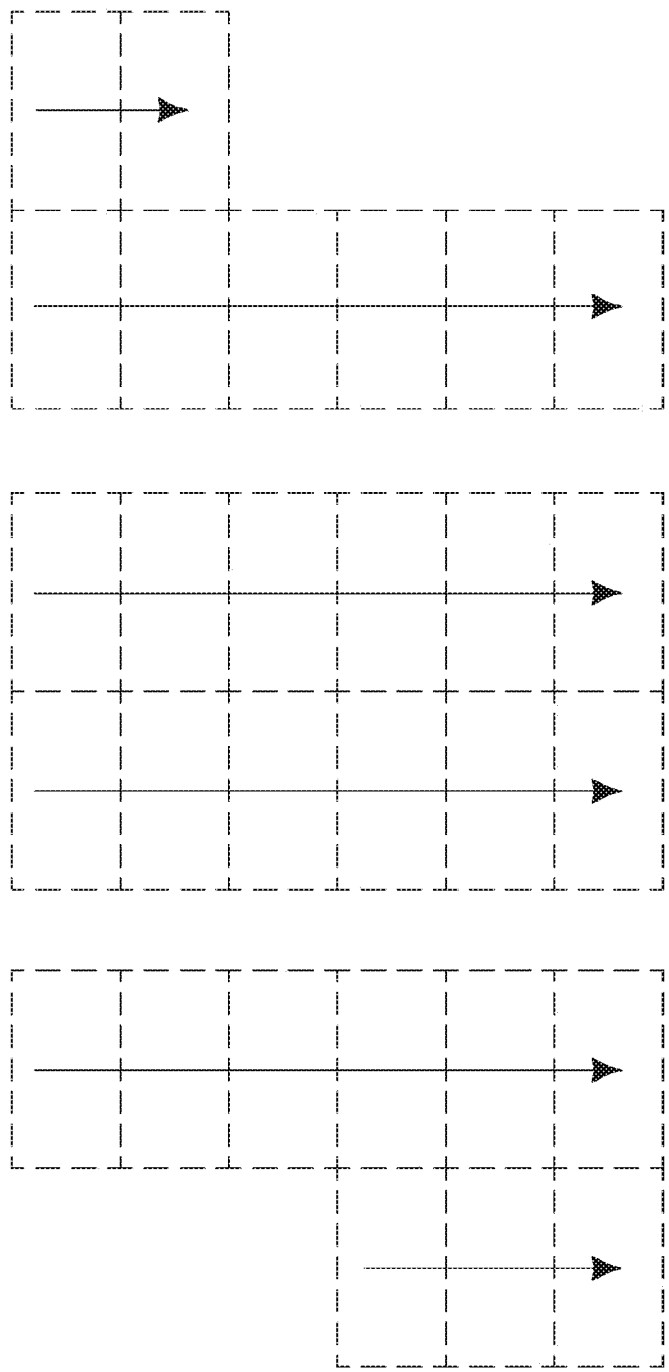

Referring now to FIGS. 19(a)-(c), an example of a Segment in three different cases for a MBS Zone with a PUSC permutation is shown. The Segment Width in this case is 12 as the region fully occupies 8 symbols (4 symbol pairs) and four other symbols (the first pair and the last pair) are partially used. The Segment First Slot Offset is 4 indicating the first three slots of the first symbol pair are not used in this Segment. The Segment Last Slot Offset is 2 indicating that only the first two slots of the last symbol pair are used.

FIG. 19(a) shows a case where the entire Segment fits within one allocation. FIG. 19(b) shows a case where the Segment is broken into two allocations. The first allocation partially occupies two symbols and fully occupies 6 symbols (3 symbol pairs). The next allocation fully occupies 2 symbols (1 symbol pair) and partially occupies the next two symbols (last symbol pair). FIG. 19(c) shows a case where the Segment is divided to three separate allocations. The first and last allocations partially occupy some symbols and the middle allocation is a rectangular region fully occupying 4 symbols (2 symbol pairs).

Figure 20:
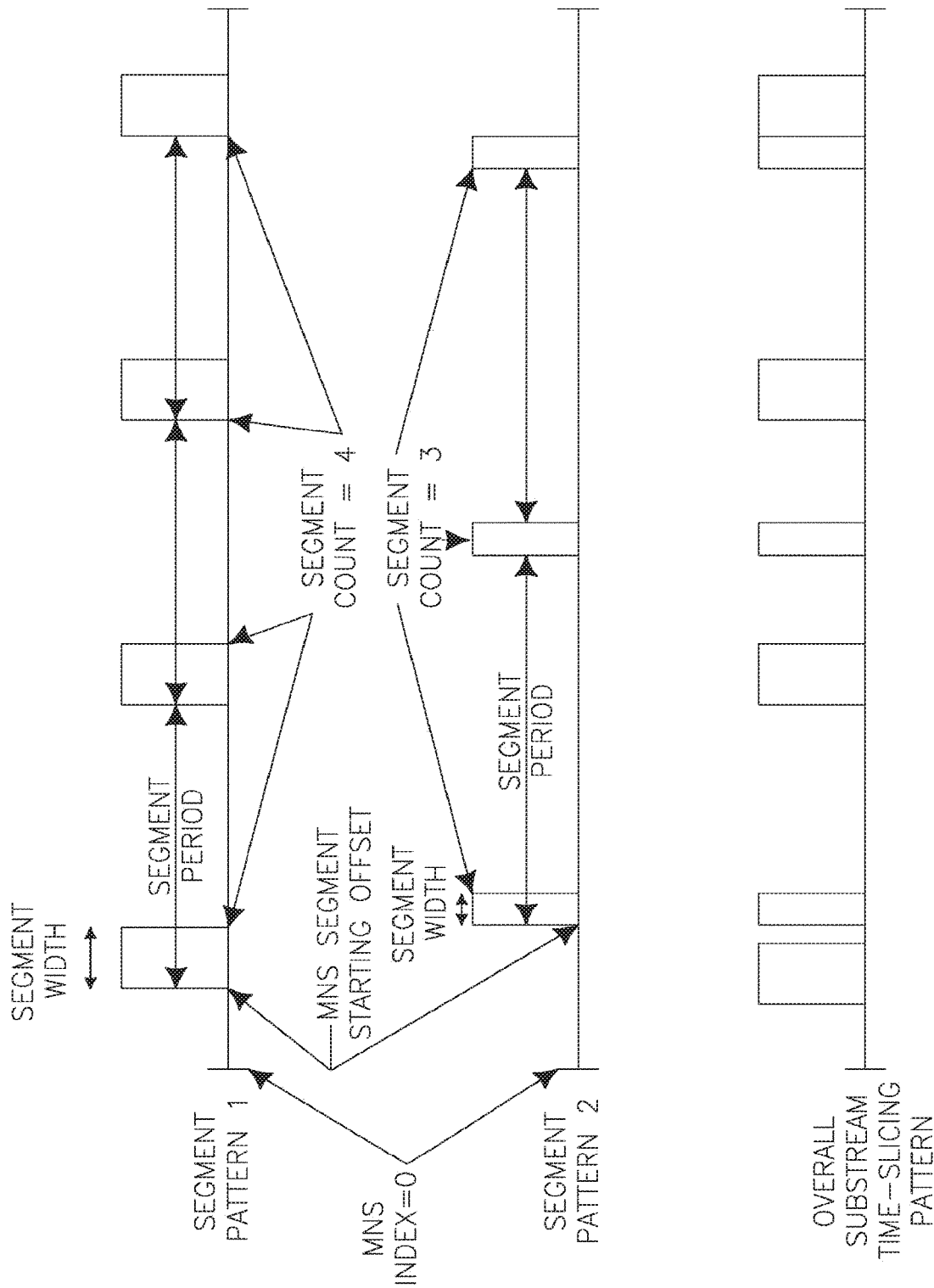
FIG. 20 shows an example diagram of a substream with two segment patterns.
Figure 21:
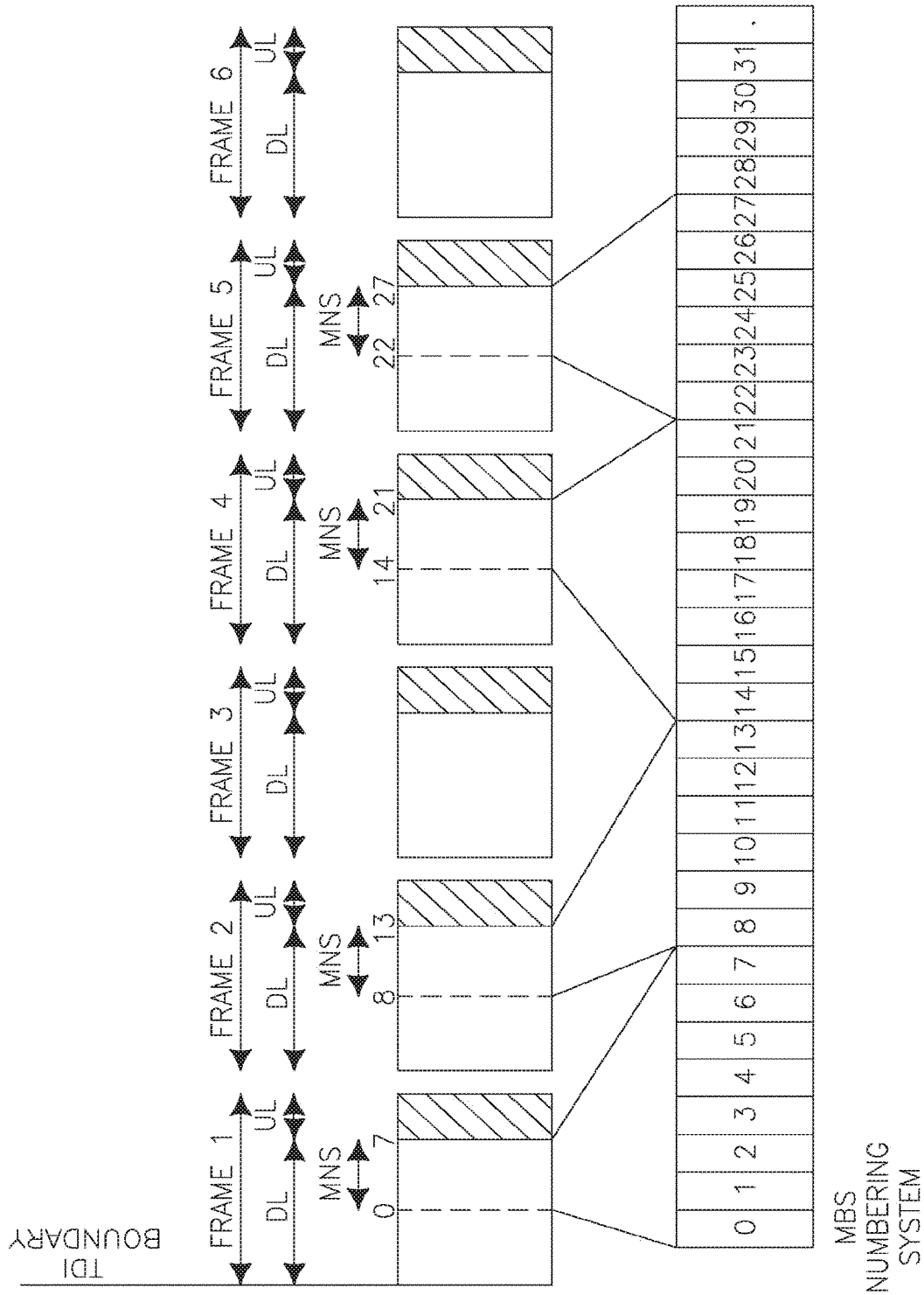
FIG. 21 shows an example diagram of a location of orthogonal frequency division multiple access (OFDMA) symbols included in a MBS numbering system (MNS)
Figure 22:
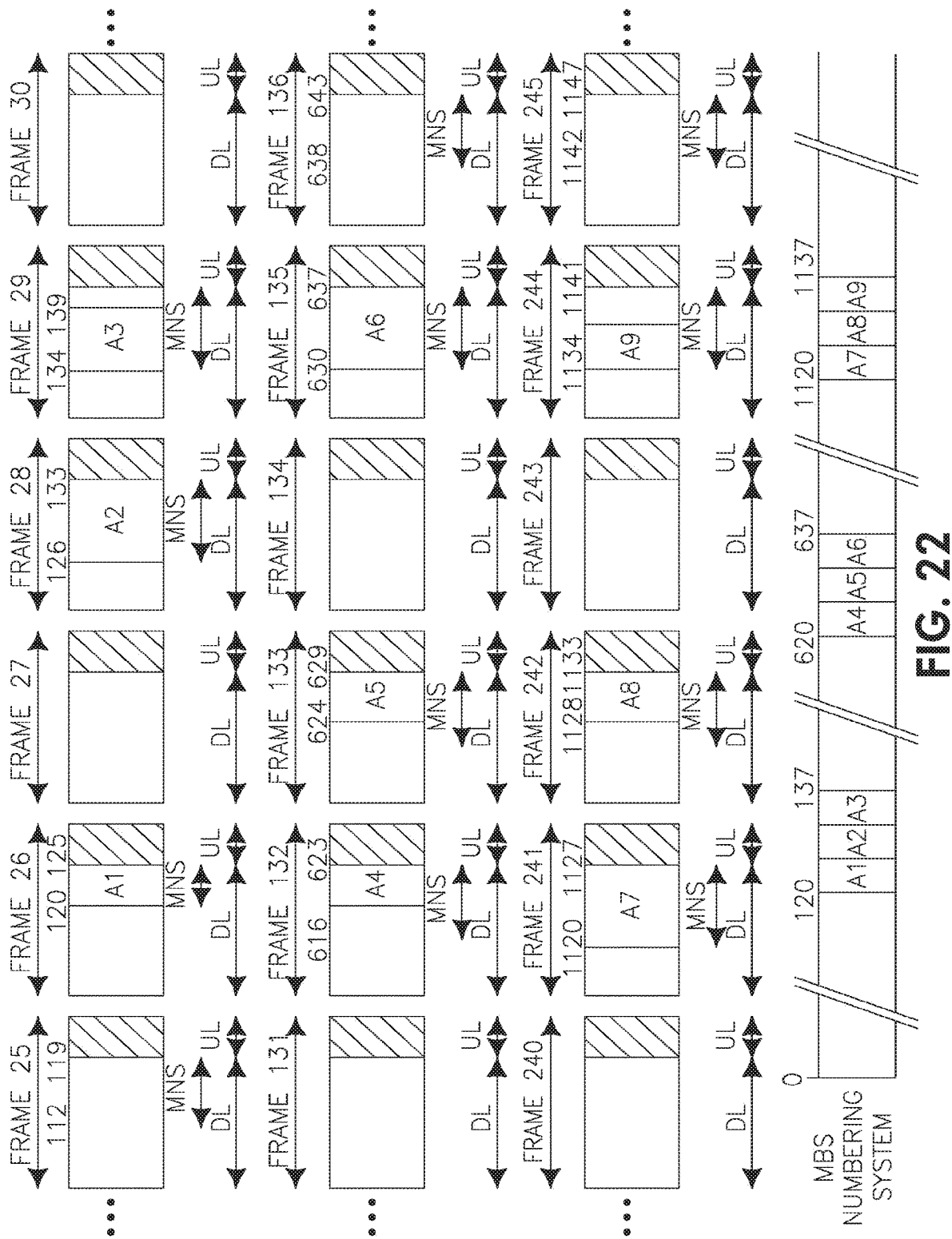
FIG. 22 shows an example diagram of locations of allocations corresponding to a segment pattern.

Referring now to FIG. 20, there is shown an example of a substream composed of two Segment patterns. Consider an MBS Zone with a PUSC permutation. Assume the MBS Pattern Vector specified in the MBS Zone Descriptor IE is $\vec{T}=(8,6,0)$. This means the last 8 symbols of the downlink subframe of the first OFDMA Frame of the TDI are labeled symbols 0 . . . 7 in the MNS. The last 6 symbols of the downlink subframe of the second OFDMA Frame of the TDI are labeled symbols 8 . . . 13 in the MNS. No symbol in the third OFDMA frame of the TDI is assigned to the MNS and hence may not be used by any MBS traffic in the current MBS Zone. The last 8 symbols of the downlink subframe of the fourth OFDMA frame of the TDI are labeled symbols 14 . . . 21 in the MNS. Similarly, the last 6 symbols of the downlink subframe of the fifth OFDMA Frame of the TDI are labeled symbols 22 . . . 27 in the MNS and no symbols in the sixth OFDMA frame of the TDI are assigned to the MNS. FIG. 21 shows the location of OFDMA symbols included in the MNS in the first six frames of the TDI.

Now consider a Segment with Segment Starting Offset of 120 in the MNS with a Segment Width of 18 symbols, repeating three times with a Segment Period of 500 symbols. Assume the Segment First Slot Offset and the Segment Last Slot Offset parameters are both set to 0x00 indicating that the Segments do not have partially used symbols. Therefore, the first instance of the Segment fully occupies symbols 120 through 137 in the MNS, the second instance of the Segment occupies symbols 620 through 637 in the MNS and the third instance occupies symbols 1120 through 1137. Note that all elements of the MBS Pattern Vector, Segment Starting Offset, Segment Width and Segment Period are all even numbers for MBS Zones with a PUSC permutation.

To identify all allocations composing a Segment Pattern, the method disclosed below is used to find the location of the first symbol of the first instance of the Segment. First form the vector $\vec{L}=(8,14,14)$. Following the procedure below, symbol 120 in the MNS is the first symbol in the MNS region of the $26^{th}$ OFDMA frame of the TDI. The last 6 symbols of this OFDMA frame are assigned to the MNS (symbol indices 120 . . . 125) and constitute the first allocation of this Segment. The $27^{th}$ OFDMA frame of the TDI does not have any symbols in the MNS. The $28^{th}$ OFDMA frame has 8 symbols assigned in the MNS (symbol indices 126 . . . 133) and the $29^{th}$ OFDMA frame has 6 symbols assigned in the MNS (symbol indices 134 . . . 139). The first allocation composing this Segment hence includes the entire 6 symbols of the $26^{th}$ OFDMA frame assigned to the MNS which are the last 6 symbols of the OFDMA downlink subframe of the frame. The second allocation composing this Segment includes the entire 8 symbols assigned to the MNS in the $28^{th}$ OFDMA frame. Finally the last allocation composing this Segment includes the first four symbols assigned to the MNS in the $29^{th}$ OFDMA frame of the TDI. These are symbols 134 . . . 137 in the MNS.

The second instance of this Segment occupies symbols 620 . . . 637 in the MNS. Symbol 620 in the MNS is the $5^{th}$ symbol among MNS allocated symbols of the $132^{nd}$ OFDMA frame in the TDI. This frame has 8 symbols assigned to the MNS, numbered 616 . . . 623. The first allocation of this Segment covers symbols 620 . . . 623 of the MNS. The second allocation covers symbols 624 . . . 629 of the MNS which are the last 6 symbols of the downlink subframe of the $133^{rd}$ OFDMA frame of the TDI. The $134^{th}$ OFDMA frame does not have any symbols assigned to the MNS. The third and final allocation of this Segment is symbols 630 . . . 637 of the MNS which is the entire MNS area in the $135^{th}$ OFDMA frame of the TDI. These are the last 8 symbols of the downlink subframe of the $135^{th}$ OFDMA frame.

The third and final instance of this Segment occupies symbols 1120 . . . 1137 of the MNS. Symbol 1120 of the MNS is the first MNS allocated symbol in the $241^{st}$ OFDMA frame of the TDI. This OFDMA frame has 8 symbols assigned to the MNS (symbol indices 1120 . . . 1127) and these entire 8 symbols form the first allocation of this Segment. The second allocation includes the entire 6 symbols in the $242^{nd}$ OFDMA frame corresponding to the MNS (symbols 1128 . . . 1133). The $243^{rd}$ OFDMA frame does not include any OFDMA symbols assigned to the MNS. The third allocation composing this Segment includes MNS symbols 1134 . . . 1137 which are the first four symbols in the $244^{th}$ OFDMA symbols assigned to the MNS. The $244^{th}$ OFDMA frame contains symbol indices 1134 . . . 1141 of the MNS.

The PHY Descriptor IE is a component of the Substream Descriptor IE and specifies the physical layer parameters for the substream.

TABLE 13

PHY Descriptor IE

| Field | Size | Notes |
|---|---|---|
| PHY Descriptor IE( ) { | | |
|   DIUC | 4 bits | |
|   Inner-FEC CRC | 1 bit | 0b0 - No CRC |
| | | 0b1 - CRC-16 |
|   Number of Fill Bytes | 15 bits | |
|   PHY PDU Indicator | 12 bits | |
| } | | |

In Table 13, the DIUC parameter specifies the modulation and coding used for encoding the content of each allocation. Table 5 specifies the modulation and coding combination associated with each DIUC value. The Inner-FEC CRC parameter specifies whether inner-FEC blocks of this substream include a CRC field. The Number of Fill Bytes field indicates the number of Fill Bytes carried at the end of the last segment of the substream in the TDI. Fill Bytes at the end of each substream may be used to fill up the space and may be discarded by the receiver when passing PDU content to the higher layer. These Fill Bytes may not be written to the RS table. If a PDU contains both data and Fill Bytes, the possible PDU CRC may be applied to both the data and the Fill Byte portions of the PDU. Any PDU that is entirely composed of Fill Bytes may use the same PDU CRC configuration indicated in the PHY Descriptor IE. Only the last Segment instance of a Substream may contain Fill Bytes. All Fill Bytes may be 0xFF. The PHY PDU Indicator parameter indicates a bitmap of allowed HARQ packet sizes in HARQ allocations.

Each Segment belonging to a substream is composed of one or more allocations. Each allocation spans the entire subchannel space (except the first and last symbol groups of the Segment) and an even number of OFDMA symbols in an OFDMA frame for MBS Zones with a PUSC permutation. Therefore, each allocation contains an integer number of slots and carries an integer number of bytes according to data values in Table 5.

Each PDU may contain a CRC field if indicated by the Inner-FEC CRC field. The CRC field in each PDU may be dropped before passing the content of the PDU to the outer-code decoding layer. The number of Fill Bytes is specified in the PHY Descriptor IE. PDUs partially or fully carrying Fill Bytes have the same CRC structure as the rest of the PDUs in the Substream. The PDU composition of each allocation is dependent of the total number of bytes the allocation carries as well as the type of the allocation. Table 14 specifies all allowed HARQ PDU sizes.

TABLE 14

HARQ PDU Sizes

| HARQ Bitmap Indicator | NEP | HARQ PDU Size (Bytes) |
| --- | --- | --- |
| 0b000000000001 | 0 | 6 |
| 0b000000000010 | 1 | 12 |
| 0b000000000100 | 2 | 18 |
| 0b000000001000 | 3 | 24 |
| 0b000000010000 | 4 | 36 |
| 0b000000100000 | 5 | 48 |
| 0b000001000000 | 6 | 60 |
| 0b000010000000 | 7 | 120 |
| 0b000100000000 | 8 | 240 |
| 0b001000000000 | 9 | 360 |
| 0b010000000000 | 10 | 480 |
| 0b100000000000 | 11 | 600 |

The PHY PDU Indicator specifies the set of HARQ sub-burst sizes that are allowed to be used in the allocation. The list of all allowed HARQ PDU sizes in a substream may be obtained by performing a bitwise binary AND operation on the PHY PDU Indicator and the HARQ Bitmap Indicator. If the result of the bitwise binary AND operation is non-zero, the associated HARQ PDU size is allowed.

Each allocation may contain the maximum number of the largest allowed HARQ PDUs that fit in the allocation. When no more HARQ PDUs of the largest allowed size may be contained in the allocation, the next largest allowed size may be used and the maximum number of HARQ PDUs of this size may be fit in the allocation. This process continues until no more of the smallest allowed HARQ PDUs may be fit in the allocation. If no allowed HARQ PDU fits in an allocation, the allocation may be discarded by the receiver.

For each HARQ PDU size, the NEP value is given in Table 14. The $N_{SCH}$ value may be calculated using the following equation:

$$N_{SCH} = \frac{HARQ \ PDU \ \text{Size in Bytes}}{6 \times MPR},$$

where the MPR values for all DIUC values are given in Table 5. A combination of HARQ PDU Size and DIUC which results in a non-integer $N_{SCH}$ value may not be used. For example, the PHY PDU Indicator is 0xA04=0b1010000001001 therefore, the allowed HARQ PDU sizes are 600, 360 and 18 bytes.

If the last allocation of a substream is 18 symbols wide in a PUSC system with 30 Subchannels and using 16QAM modulation and rate 1/2 coding, then the total number of slots in this allocation is 270 and the total number of bytes in the allocation is 3240.

In one example, assume that the Inner-FEC CRC Indicator is set to 0b1, indicating that each PDU has a two-byte CRC-16 field. Moreover, assume that the Number of Fill Bytes is 50 bytes. The allocation therefore contains 5 HARQ PDUs of 600 bytes, and 13 HARQ PDUs of 18 bytes each which overall contain 3234 bytes. The last 6 bytes of the allocation are not assigned to any HARQ PDUs and may be discarded by the receiver. Each HARQ PDU contains a two byte CRC-16. Therefore, the first 5 HARQ PDUs carry 598 data bytes each and the next 13 HARQ PDUs each carry 16 bytes for a total of 3198 bytes. The first 3148 bytes may be passed to the Convergence Sublayer and the last 50 bytes are Fill Bytes (0xFF) and may be discarded at the receiver. These 50 bytes completely occupy the last 3 PDUs and two bytes of another PDU.

The Outer Coding IE is a component of the Substream Descriptor IE and specifies the Reed-Solomon outer coding parameters in the substream. The parameters are shown in Table 15.

TABLE 15

Outer Coding IE

| Field | Size | Notes |
| --- | --- | --- |
| Outer Coding IE( ) { | | |
|   Outer Coding Mode | 3 bits | |
|   Length | 5 bits | |
|   If (Outer Coding Mode == 0b001) { | | |
|     Scrambling Increment | 9 bits | |
|     No. of parity columns | 7 bits | |
|     No. of data columns | 8 bits | |
|   } | | |
| } | | |

In Table 15, the Outer Coding Mode is a field that identifies what outer coding scheme is used. The RS outer-coding mode 1 (0b001) is defined. The Length parameter is the length of the outer coding IE in bytes. If the Scrambling Increment field is set to 0x00, no outer-coded data scrambling may be used. If this field is any number other than 0, it specifies the number of entire outer-code block columns that may be scrambled. The process of scrambling is described above.

The No. of parity columns parameter is defined for outer coding Mode 0b001. This field indicates the total number of parity columns in the RS table. The No. of data columns parameter is defined for outer coding Mode 0b001. This field specifies the actual number of columns in the data section of the RS table.

Although features and elements are described above in particular combinations, each feature or element may be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

The subject matter described herein may be embodied in systems, apparatus, methods, and/or articles depending on the desired configuration. Base station 110A (or one or more components therein) may be implemented using one or more of the following: a processor executing program code, an application-specific integrated circuit (ASIC), a digital signal processor (DSP), an embedded processor, a field programmable gate array (FPGA), and/or combinations thereof. Client station 114B (or one or more components therein) may be implemented using one or more of the following: a processor executing program code, an application-specific integrated circuit (ASIC), a digital signal processor (DSP), an embedded processor, a field programmable gate array (FPGA), and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, applications, components, program code, or code) include machine instructions for a programmable processor, and may be implemented in a high-level procedural and/or object-oriented programming language, and/or in assembly/machine language. As used herein, the term "machine-readable medium" refers to any computer program product, computer-readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. Similarly, systems are also described herein that may include a processor and a memory coupled to the processor. The memory may include one or more programs that cause the processor to perform one or more of the operations described herein.

Although a few variations have been described in detail above, other modifications or additions are possible. In particular, further features and/or variations may be provided in addition to those set forth herein. For example, the implementations described above may be directed to various combinations and subcombinations of the disclosed features and/or combinations and subcombinations of several further features disclosed above. In addition, the logic flow depicted in the accompanying figures and/or described herein does not require the particular order shown, or sequential order, to achieve desirable results. Other embodiments may be within the scope of the following claims.

What is claimed is:

1. A method for use by a base station, the method comprising:
    receiving, by the base station, a single message including information indicating a pattern of sub-intervals within a time divided interval and information indicating resources for use in broadcasting multicast broadcast service data, wherein the base station belongs to the multicast broadcast region which includes a plurality of base stations;
    receiving, by the base station, a multicast broadcast data stream; and
    broadcasting, by the base station, the multicast broadcast data stream in at least one sub-interval of the pattern of sub-intervals using the indicated resources, as an orthogonal frequency division multiplex signal.

2. The method of claim 1, wherein the multicast broadcast data stream is for a service and the resources are for the service.

3. The method of claim 1, wherein multicast broadcast service data for the multicast broadcast region is not broadcasted in sub-intervals not of the pattern of sub-intervals.

4. The method of claim 1, wherein the sub-intervals are frames.

5. The method of claim 1, wherein the pattern of sub-intervals repeats each time divided interval.

6. The method of claim 1, wherein the received information for the multicast broadcast region constrains scheduling by the base station.

7. A base station comprising:
    an interface configured to receive a single message including information indicating a pattern of sub-intervals within a time divided interval and information indicating resources for use to broadcast multicast broadcast service data, wherein the base station belongs to the multicast broadcast region which includes a plurality of base stations;
    the interface further configured to receive a multicast broadcast data stream; and
    a processor configured to control a radio interface to broadcast the multicast broadcast data stream in at least one sub-interval of the pattern of sub-intervals, using the indicated resources as an orthogonal frequency division multiplex signal.

8. The base station of claim 7, wherein the multicast broadcast data stream is for a service and the resources are for the service.

9. The base station of claim 7, wherein the processor does not have the interface broadcast multicast broadcast service data for the multicast broadcast region in sub-intervals not of the pattern of sub-intervals.

10. The base station of claim 7, wherein the sub-intervals are frames.

11. The base station of claim 7, wherein the pattern of sub-intervals repeats each time divided interval.

12. The base station of claim 7, wherein the received information for the multicast broadcast region constrains scheduling by the processor.

13. A method for use by a base station, the method comprising:
   receiving, by the base station, a single message including information indicating a pattern of sub-intervals within a time divided interval and information indicating resources for use in broadcasting multicast broadcast service data, wherein the base station belongs to the multicast broadcast region which includes a plurality of base stations;
   receiving, by the base station, a multicast broadcast data stream; and
   broadcasting, by the base station, the multicast broadcast data stream in at least one sub-interval of the pattern of sub-intervals using the indicated resources, as an orthogonal frequency division multiplex signal;
   wherein the received information indicating a pattern of sub-intervals is received in an information element.

14. The method of claim 13, wherein the information element is a vector.

15. The method of claim 13, wherein the multicast broadcast data stream is for a service and the resources are for the service.

16. The method of claim 13, wherein multicast broadcast service data for the multicast broadcast region is not broadcasted in sub-intervals not of the pattern of sub-intervals.

17. The method of claim 13, wherein the sub-intervals are frames.

18. The method of claim 13, wherein the pattern of sub-intervals repeats each time divided interval.

19. The method of claim 13, wherein the received information for the multicast broadcast region constrains scheduling by the base station.

20. The method of claim 13, wherein the pattern of sub-intervals is received in advance of the multicast broadcast data stream.

* * * * *